US009242561B2

(12) United States Patent
Katayama

(10) Patent No.: US 9,242,561 B2
(45) Date of Patent: Jan. 26, 2016

(54) MANUALLY PROPELLED VEHICLE

(71) Applicant: Funai Electric Co., Ltd., Osaka (JP)

(72) Inventor: Takahiro Katayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/471,761

(22) Filed: Aug. 28, 2014

(65) Prior Publication Data
US 2015/0066278 A1  Mar. 5, 2015

(30) Foreign Application Priority Data

Aug. 30, 2013 (JP) .................................. 2013-180243

(51) Int. Cl.
| B60L 9/00 | (2006.01) |
| B60L 3/00 | (2006.01) |
| B60L 15/20 | (2006.01) |
| A61H 3/04 | (2006.01) |
| B62B 5/00 | (2006.01) |

(52) U.S. Cl.
CPC ................ B60L 3/0015 (2013.01); A61H 3/04 (2013.01); B60L 15/2036 (2013.01); B62B 5/0069 (2013.01); A61H 2003/043 (2013.01); A61H 2201/0176 (2013.01); A61H 2201/5064 (2013.01)

(58) Field of Classification Search
CPC ..... B60L 3/0015; B60L 15/2036; A61H 3/04; A61H 2003/043; A61H 2201/0176; A61H 2201/5064

USPC ............................................ 701/22; 180/6.66
See application file for complete search history.

(56) References Cited

U.S. PATENT DOCUMENTS

| 2011/0118898 A1* | 5/2011 | Fu et al. ............................ 701/1 |
| 2011/0166753 A1 | 7/2011 | Yu et al. |
| 2015/0075575 A1* | 3/2015 | Karlovich ....................... 135/66 |

FOREIGN PATENT DOCUMENTS

| DE | 19614411 A1 | 10/1996 |
| DE | 102011080056 A1 | 1/2013 |
| DE | 202012011634 U1 | 2/2013 |
| DE | 102011084236 A1 | 4/2013 |
| EP | 0976378 A1 | 2/2000 |
| JP | 2898969 B1 | 6/1999 |

OTHER PUBLICATIONS

Extended European Search Report issued in corresponding European Application No. 14182917.6, mailed Jun. 3, 2015 (7 pages).

* cited by examiner

*Primary Examiner* — Luke Huynh
(74) *Attorney, Agent, or Firm* — Osha Liang LLP

(57) ABSTRACT

A manually propelled vehicle may include a vehicle body, a left drive wheel and a right drive wheel, a wheel driver that drives the left and right drive wheels, a sensor that detects a user behind the vehicle body, and a controller that determines whether the user is behind the left or right drive wheel based on a detected result of the sensor. When one of the left or right drive wheel moves backward and the controller detects that the user is behind the one of the left or right drive wheel, the controller suppresses or stops the wheel driver from driving the one of the left or right drive wheel.

16 Claims, 16 Drawing Sheets

MANUALLY PROPELLED VEHICLE

TECHNICAL FIELD

The field of the invention relates to a manually propelled vehicle (e.g., ambulatory assist vehicles, baby carriages, dollies, wheelchairs, and the like).

RELATED ART

Conventional manually propelled vehicles are configured so as to change direction freely according to the difference of the external force applied to right and left grips. Further, in recent years, development of mobile assistance tools for going out have advanced with the application of robotic technologies such as sensors and actuators, and the mounting of human-power assist functions (so-called motor assisted functions) onto manually propelled vehicles (e.g., ambulatory assist vehicles to support elderly or people with trouble walking to go out) are being studied.

In common manually propelled vehicles, a user moves forward by pushing the manually propelled vehicle from the rear. At that time, in order to assist walking by the user, the manually propelled vehicle provides torque to a drive wheel according to an amount of force to push the manually propelled vehicle by the user. A burden on the user is reduced by such assisting operation.

As an example of conventional art relevant to the present invention, Patent Document 1 discloses an ambulatory assist vehicle that operates according to a mobility assisting operation that is set in advance when moving forward, moving backward, and turning.

DOCUMENTS OF THE RELATED ART

PATENT DOCUMENT

[Patent Document 1] Japanese Unexamined Patent Application Publication No. 2898969

However, when turning a manually propelled vehicle to the right or left, even though an outer wheel moves forward, there may be a case where an inner wheel moves backward. For example, in a conventional manually propelled vehicle that is equipped with an electromotor assist function, the rear wheel is often the drive wheel and the front wheel is the idler wheel, and the inner wheel side of the drive wheel is easy to move backward during a turning motion. In such case, if a user is familiar with the operation of the manually propelled vehicle, a collision with the manually propelled vehicle can be avoided by moving in accordance with the turning operation of the manually propelled vehicle. On the other hand, when a user is not familiar with it, the user often cannot correspond to the operation of the manually propelled vehicle. Further, the manually propelled vehicle that is equipped with the electromotor assist function as described above performs drive assistance by providing torque to the drive wheel in order to assist walking of the user. Therefore, there is a risk where the user may collide harder than that of the manually propelled vehicle that is not equipped with the electromotor assist function, and furthermore, a foot of the user may contact the drive wheel that is moving backwards.

The conventional art of Patent Document 1 does not mention these problems, and it is necessary to readjust the settings in advance of the mobility assisting operation of the ambulatory assist vehicle according to the skill level of the user.

SUMMARY OF THE INVENTION

One or more embodiments of the invention provide a manually propelled vehicle that can buffer or prevent a collision with a user during a turning motion.

According to one or more embodiments, a manually propelled vehicle may comprise: a vehicle body; a left drive wheel and a right drive wheel; a wheel driver that drives the left and right drive wheels; a sensor that detects a user behind the vehicle body; and a controller that determines whether the user is behind the left or right drive wheel based on a detected result of the sensor, wherein when one of the left or right drive wheel moves backward and the controller detects that the user is behind the one of the left or right drive wheel, the controller may suppress or stop the wheel driver from driving the one of the left or right drive wheel. By having such configuration, for example, even if one of the left or right drive wheels has moved rearward, when turning the manually propelled vehicle, the electromotor drive of one of the rearward moving left or right drive wheel may be suppressed or stopped when it is determined that there is the user behind the rearward moving drive wheel. According to one or more embodiments, when the manually propelled vehicle is turned, the manually propelled vehicle can buffer or prevent a collision with the user who is behind the manually propelled vehicle because the turning motion of the manually propelled vehicle can be braked or stopped.

According to one or more embodiments, the sensor may comprise a distance sensor provided between the left and right drive wheels and that detects whether the user is behind the vehicle body in an area that is not behind the left or right drive wheel when viewed from vertically above in a planar view, the distance sensor may output a distance to an object located behind the distance sensor, and when the one of the left or right drive wheel moves backward and the distance output by the distance sensor is greater than or equal to a threshold, the controller may suppress or stop the wheel driver from driving the one of the left or right drive wheel. By having such configuration, for example, when turning the manually propelled vehicle, the distance sensor provided between the left and right drive wheels may detect whether or not the user is behind the vehicle body part except behind the left and right drive wheels. Further, for example, if the distance outputted by the distance sensor is not less than the distance threshold, it may be estimated that the user is behind one of the drive wheels. Then, for example, the electromotor drive of that side that is the rearward moving drive wheel may be suppressed or stopped. According to one or more embodiments, a collision between the user and the manually propelled vehicle can be buffered or prevented by the distance sensor provided between the left and right drive wheels.

According to one or more embodiments, the sensor may comprise a distance sensor provided respectively above the left and right drive wheels, each of the distance sensors respectively may output a distance to an object located behind the distance sensor, and when the one of the left or right drive wheel moves backward and the distance output by the distance sensor provided above the one of the left or right drive wheel is less than a threshold, the controller may suppress or stop the wheel driver from driving the one of the left or right drive wheel. By having such configuration, for example, when turning the manually propelled vehicle, if the distance outputted by the distance sensor above the side which has a rearward moving drive wheel is less than the threshold, it may be determined that the user is behind the side which has a rearward moving drive wheel. Then, the electromotor drive of that side that is the rearward moving drive wheel may be suppressed or stopped. According to one or more embodiments, a collision between the user and the manually propelled vehicle can be buffered or prevented by the distance sensor provided respectively above the left and right drive wheels.

According to one or more embodiments, the sensor may comprise a range sensor that detects a location of the user by scanning behind the vehicle body. By having such configuration, for example, the location of the user behind the vehicle body part may be detected by the range sensor. According to one or more embodiments, the manually propelled vehicle can determine accurately whether or not the user is behind the left or right drive wheel (e.g., one side that is the rearward moving drive wheel) based on the detected position of the user.

According to one or more embodiments, the sensor detect whether a leg of the user is behind the left or right drive wheel. By having such configuration, for example, contact between the leg of the user and the wheel of that side having a rearward moving drive wheel can be prevented, or an impact at the time of contact can be buffered.

One or more embodiments of the present invention can provide a method for controlling a manually propelled vehicle comprising a vehicle body, a left drive wheel and a right drive wheel that are driven and controlled independently to move the vehicle body along with a walking user, and a wheel driver that drives the left and right drive wheels. The method may comprise: detecting the user behind the vehicle body; determining whether the user is behind the left or right drive wheel based on the detecting; and when one side of the left or right drive wheel moves backward and the determining determines that the user is behind the one side of the left or right drive, suppressing or stopping the wheel driver from driving the one of the left or right drive wheel.

DETAILED DESCRIPTION OF EMBODIMENTS

FIRST EXAMPLE

Figure 1:
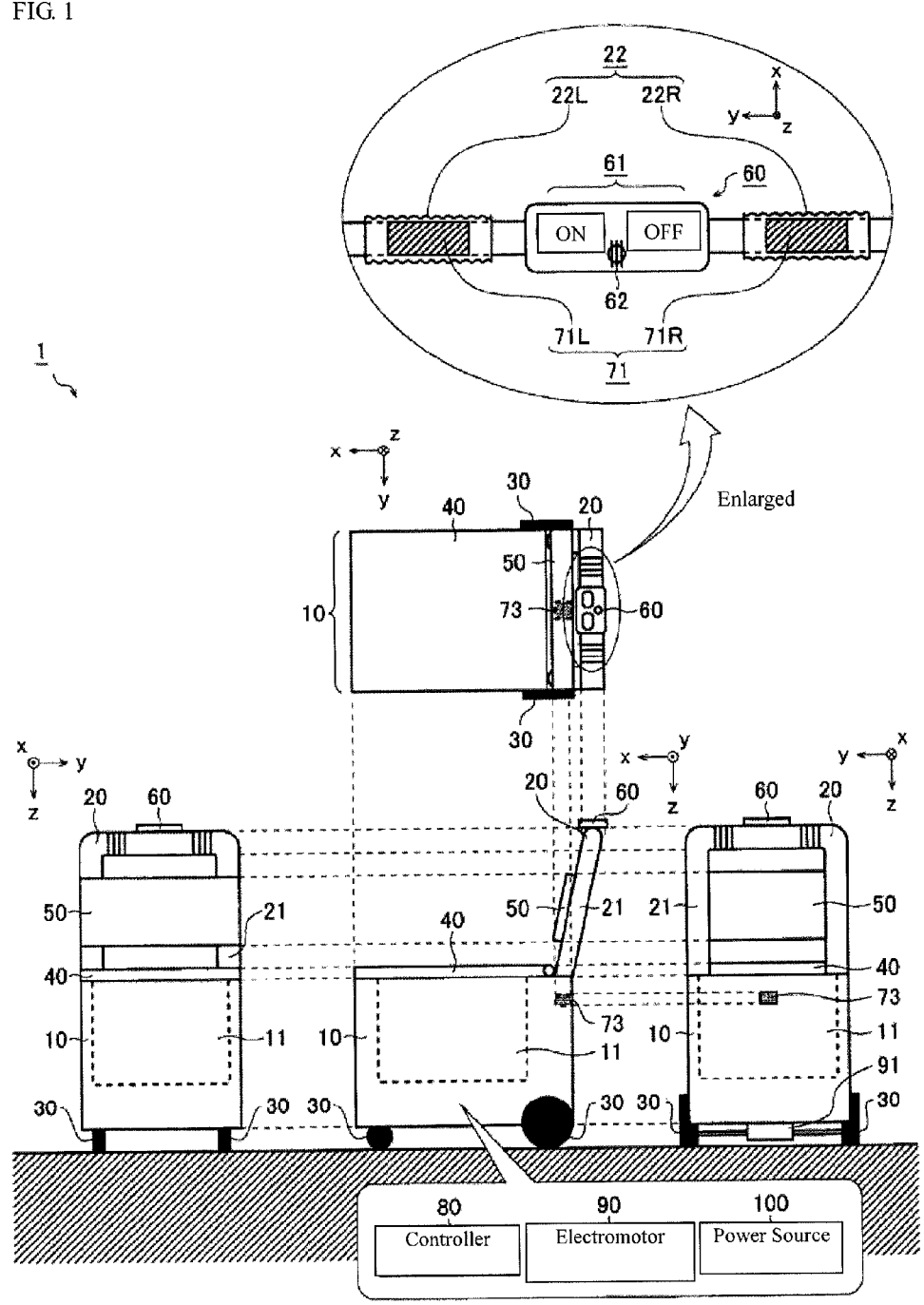
FIG. 1 is an external view of an manually propelled vehicle 1 according to one or more embodiments of a first example.
Figure 2:
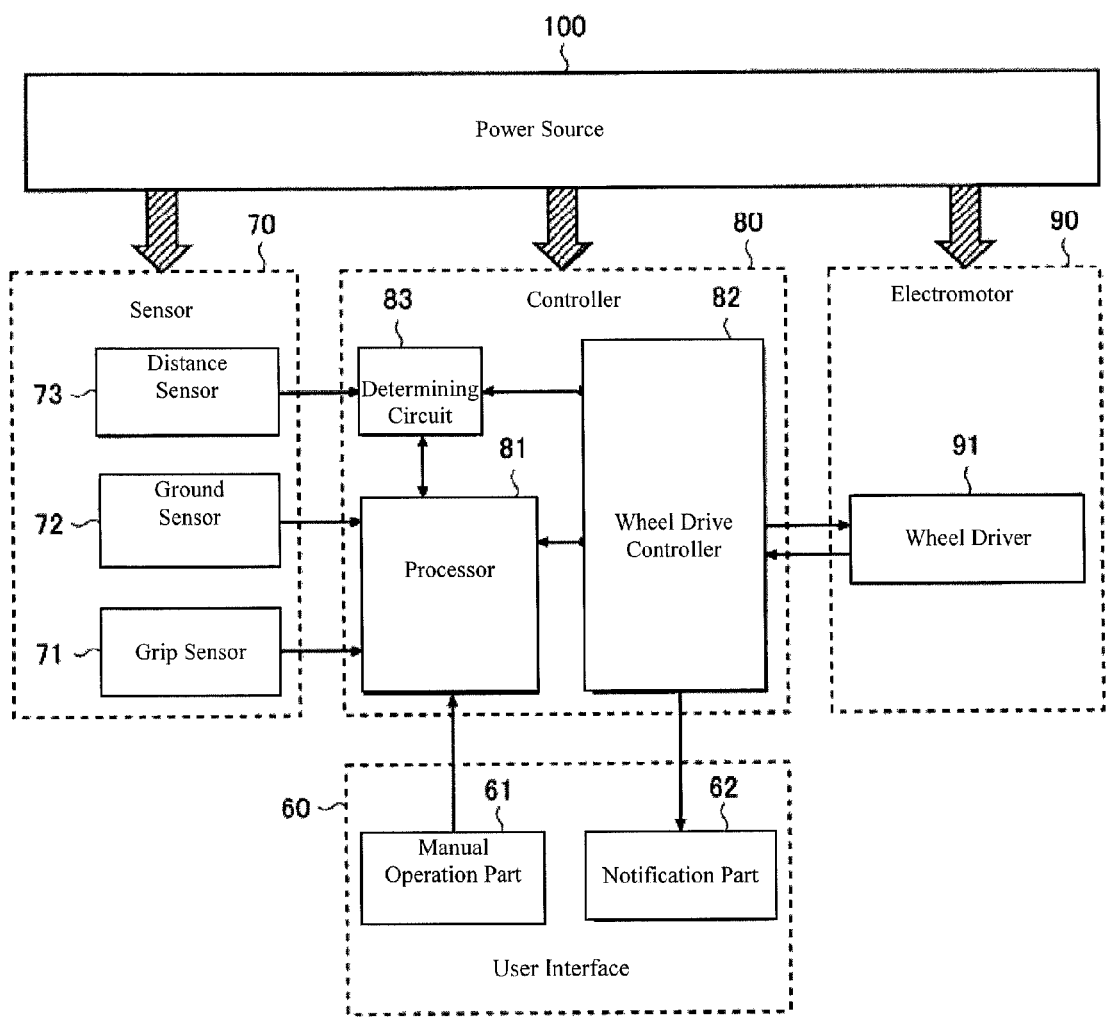
FIG. 2 is a functional block diagram of the manually propelled vehicle 1 according to one or more embodiments of the first example.

FIG. 1 and FIG. 2 respectively illustrate an external view and a functional block diagram of an manually propelled vehicle 1 according to one or more embodiments of a first example. The lower part of FIG. 1 schematically illustrates from left to right on the sheet in order, a front view (front elevation), a left lateral view, and a posterior view (back elevation) of the manually propelled vehicle 1, and the middle center part of FIG. 1 illustrates a top view of the manually propelled vehicle 1. Further, the upper part of FIG. 1 illustrates an enlarged view of the handle part, schematically.

The manually propelled vehicle 1 may be a so-called walker to assist walking of a user (e.g., elderly with a weak lower body) and may also be used as a basket for carrying baggage and a seat for resting. The manually propelled vehicle 1 may comprise a vehicle body 10, a grip 20, a wheel 30, a seat 40, a backrest 50, a user interface 60, a sensor 70, a controller 80, an electromotor 90, and a power source 100.

The vehicle body 10 may be a chassis (frame) of the manually propelled vehicle 1 on which the configuration elements 20 to 100 listed above are mounted. Further, a space as a baggage compartment 11 may be provided inside (lower part of the seat 40) the vehicle body 10. Stainless steel, aluminum alloy, or the like may be used for the frame material faulting the vehicle body 10.

The grip 20 may be member where the user grips at the time of walking and connected to the vehicle body 10 via a support part 21. The user can move the manually propelled vehicle 1 forward, backward, braking, and turning by applying human power through gripping the grip 20 with both hands or with one hand. In addition, the grip 20 may comprise a slip resistance grip 22 (left hand grip 22L and right hand grip 22R). Further, a height adjustment mechanism may be provided to the grip 20 or the support part 21.

Figure 3:
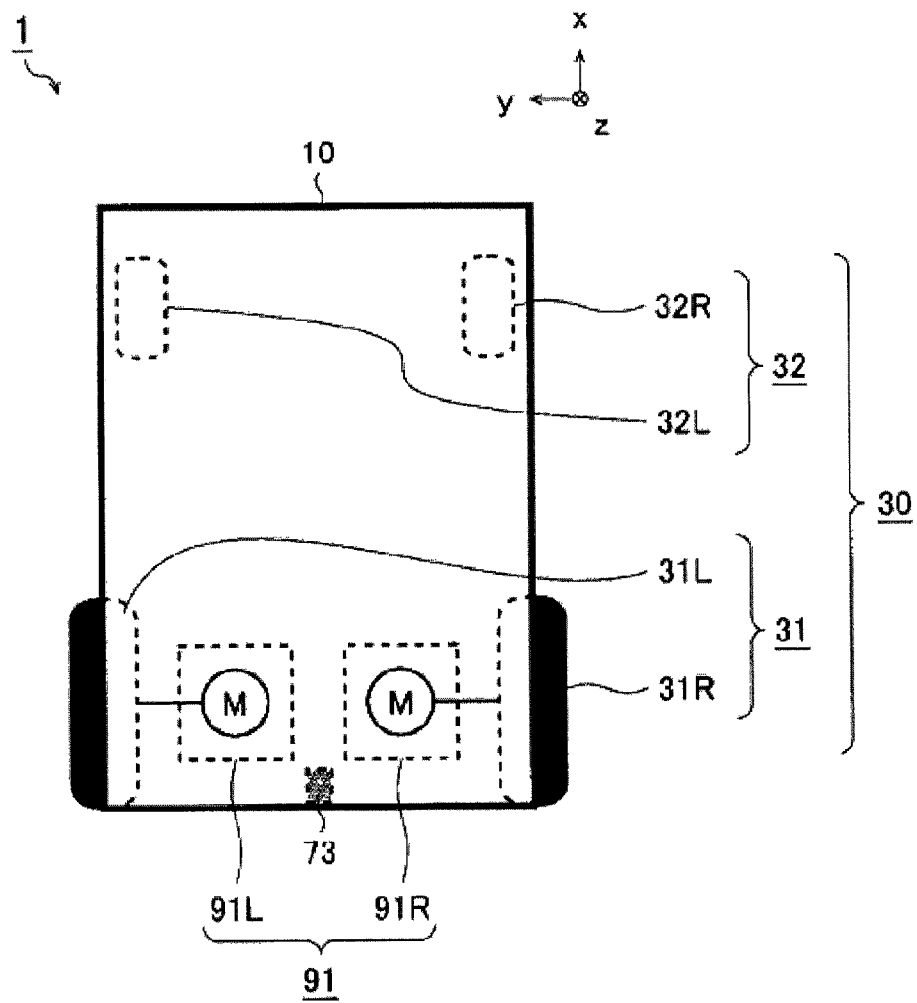
FIG. 3 is a schematic diagram illustrating an example of one configuration of a wheel and a wheel driver according to one or more embodiments.

The wheel 30 may be an annular member in order to move the vehicle body 10 along the ground by rotating in harmony with the walking of the user. FIG. 3 is a schematic diagram illustrating an example of one configuration of the wheel 30 and a wheel driver 91. As illustrated in FIG. 3, the wheel 30 may be a four-wheel structure comprising drive wheels 31 (left and right drive wheels 31L and 31R) that are rotated at the axle center by human power (or auxiliary power) and idler wheels 32 (left and right coupled drive wheels 32L and 32R) for turning direction. The left and right drive wheels 31L and 31R may be driven and controlled independently by the rotation speed, rotation direction, and rotation torque respectively corresponding to each wheel driver 91L and 91R described below.

The seat 40 may be a plate-like member for the user to sit down on when seating. Further, the seat 40 may also function as an upper lid of the luggage compartment 11 and be attached so as to enable the upper opening part of the baggage compartment 11 to open and close.

The backrest 50 may be a plate-like member for the user to lean back against when seating. In addition, the backrest 50 may be attached to the support part 21 or integrally provided with the vehicle body 10.

The user interface 60 may be means to exchange information between the user and the controller 80 and may include a manual operation part 61 and a notification part 62. The manual operation part 61 may be means for receiving the manual operation of the user including, for example, an ON/OFF button on the electromotor assist function. The notification part 62 may be means for informing the user of various information. As the notification part 62, a light emitting diode, a liquid crystal display panel, or the like may be used other than a speaker as illustrated. The user interface 60 may be provided at a position where the user can easily operate (for example, the grip 20 that is near the height of the eyes of the user.

The sensor 70 may be means for monitoring surrounding conditions, usage condition of the manually propelled vehicle 1, or a walking posture of the user and a relative position to the manually propelled vehicle 1. The sensor 70 may comprise a grip sensor 71 and a ground sensor 72, and a distance sensor 73. The grip sensor 71 may be means for monitoring a distribution of pressure applied to the grip 20, and may comprise a left hand grip sensor 71L provided at the left hand grip 22L and a right hand grip sensor 71R provided at the right hand grip 22R.

Figure 4:
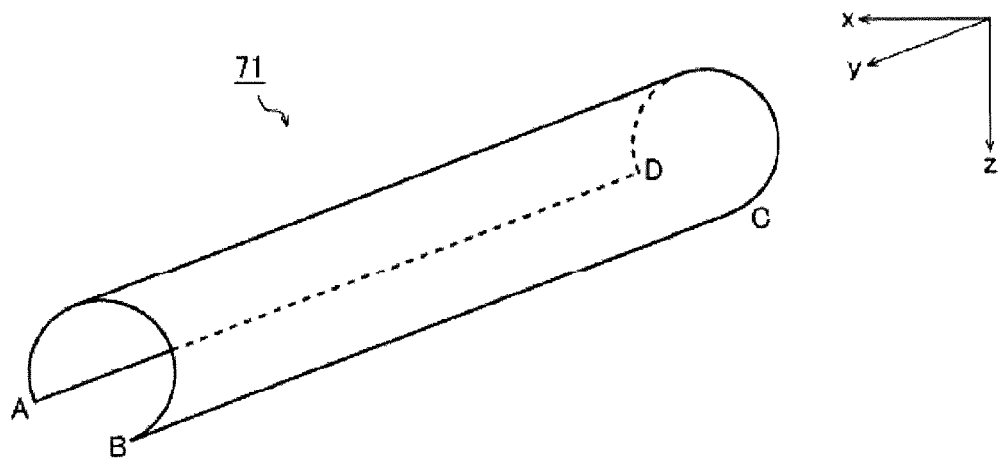
FIG. 4 is a perspective view illustrating an example of one configuration of a grip sensor according to one or more embodiments.
Figure 5:
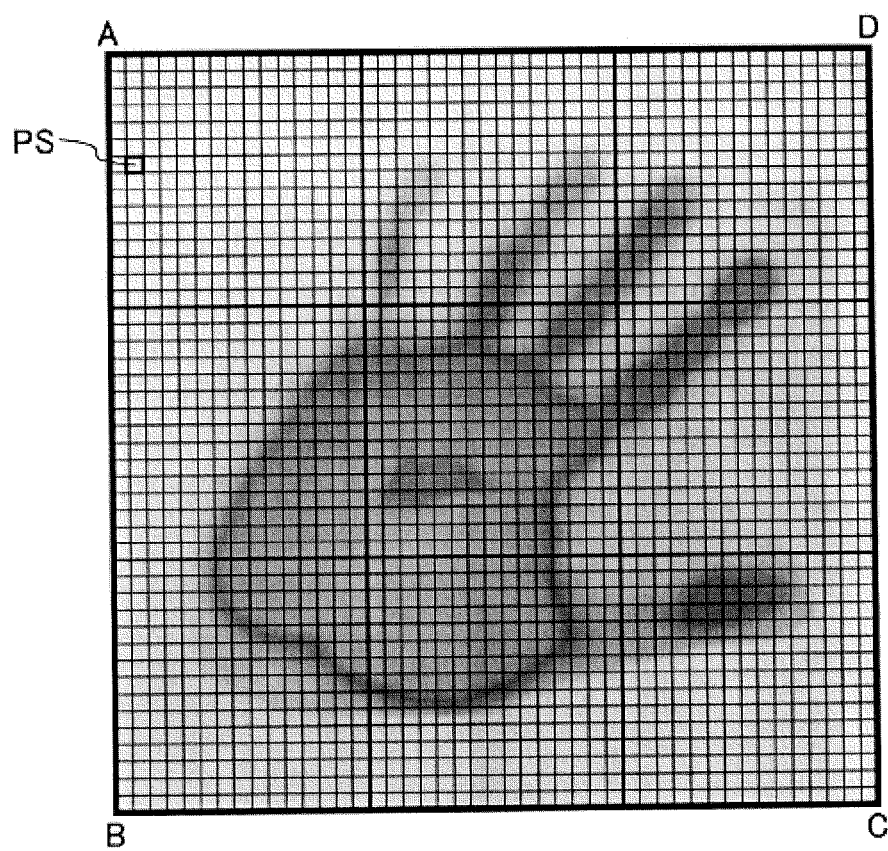
FIG. 5 is a plan expansion view illustrating an example of one configuration of the grip sensor according to one or more embodiments.

Each of FIG. 4 and FIG. 5 is a perspective view and a plan expansion view illustrating an example of one configuration of the grip sensor 71. Reference numerals A to D correspond to four corners of the grip sensor 71 illustrated in both drawings. The grip sensor 71 may be a sheet-like member where a plurality of pressure sensors PS is arranged in a matrix and used by winding around the grip 20. The plurality of pressure sensors PS may output an electric signal in which the signal level (for example, a voltage value) fluctuates according to the amount of pressure applied to each. Accordingly, when the user is holding the grip 20, a distribution of pressure according to the gripping conditions may be detected by the grip sensor 71. The pressure distribution may be detected by both sides of the left hand grip sensor 71L and the right hand grip sensor 71R when being operated by both hands, and when being operated by one hand, either one side of the left hand grip sensor 71L or the right hand grip sensor 71R.

In the example of the present configuration, the left hand grip sensor 71L and the right hand grip sensor 71R are physically separated; however, the structure of the grip sensor 71 is not limited thereto. The sensor 71 may be formed integrally without separating the left hand grip sensor 71L and the right hand grip sensor 71R from each other. Or on the contrary, each of the left hand grip sensor 71L and the right hand grip sensor 71R may be further separated from each other.

A ground sensor 72 may respectively detect the grounded state of the drive wheel 31 and the idler wheel 32. A load sensor of a suspension type provided between the vehicle body 10 and the wheel 30 may be used as the ground sensor 72. The grounded state of the drive wheel 31 may also be presumed from the output of a current sensor 913 to be described later rather than providing the load sensor separately. For example, when the drive currents running to the left and right motors 911L and 911R to be described later are decreased steeply and fall below a predetermined threshold, it can be determined that the drive wheel 31 is an ungrounded state.

Figure 6:
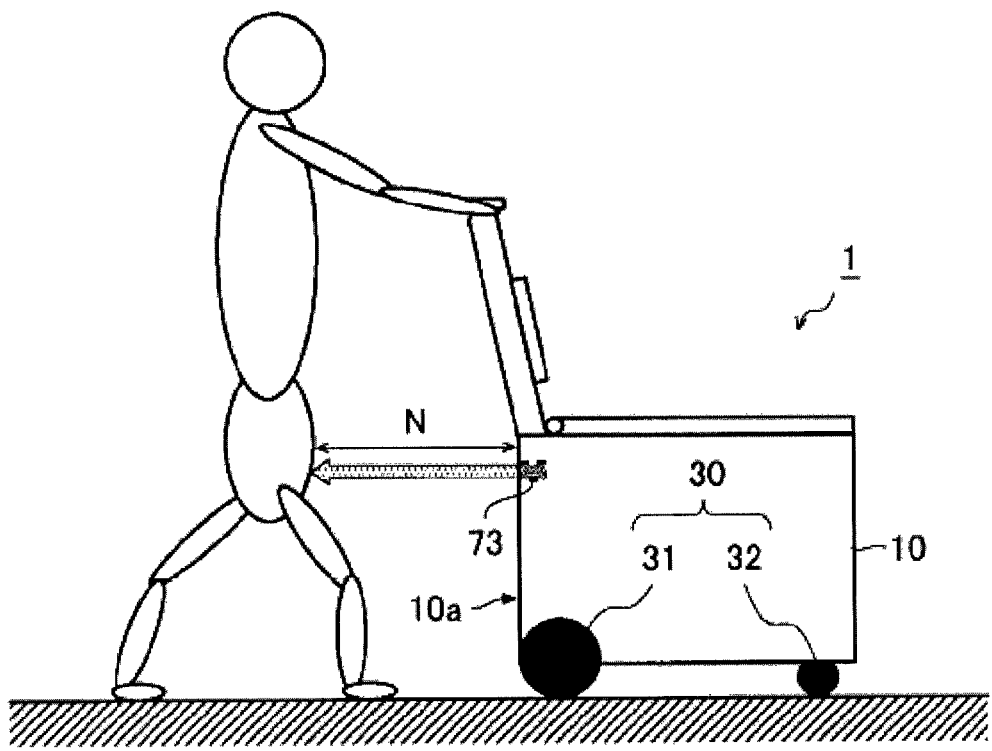
FIG. 6 is a side view illustrating a location of a distance sensor in one or more embodiments of the first example.

The distance sensor 73 may detect a user who is positioned rearward of the manually propelled vehicle 1 (vehicle body 30). For example, the distance sensor 73 may be provided between the left and right drive wheels 31L and 31R in order to detect whether the user is rearward of the vehicle body 10 except behind the drive wheel 31 in a planar view viewed from vertically above. For the distance sensor 73, for example, an infrared sensor, an ultrasonic sensor, or the like may be used. FIG. 6 is a side view illustrating a position of the distance sensor 73 according to one or more embodiments of the first example. As illustrated in FIG. 6, the distance sensor 73 may be provided on the backside surface 10a of the vehicle body 10, and outputs a distance N to an object (e.g. user) positioned rearward of the distance sensor 73. Further, the distance sensor 74 may be disposed between the left and right drive wheels 31L and 31R in a planar view viewing the manually propelled vehicle 1 from vertically above (see FIG. 11 described below). Furthermore, the disposition position in the vertical direction of the distance sensor 73 is not particularly limited. The distance sensor 73 may be disposed, for example, in a position where the torso part of the user is detected, as illustrated in FIG. 6, or in a position where the leg of the user is detected.

The controller 80 may be a logic circuit (such as a microcomputer) that comprehensively controls the user interface 60, sensor 70, and electromotor 90. The controller 80 may comprise a processor 81, a wheel drive controller 82, and a determining circuit 83 as a functional block. The processor 81 may determine a turning target value (e.g., such as a target value of a driving direction and driving force of the left and right drive wheels 31L and 31R) according to the output of the grip sensor 71. The wheel drive controller 82 may control the rotation direction and the rotation speed of the left and right drive wheels 32L and 32R according to the turning target value. The determining circuit 83 may determine whether or not the user is behind the drive wheel 31 based on the detection result of the distance sensor 73. Further, the determining circuit 83 may even determine whether or not a distance detected by the distance sensor 73 is less than a predetermined distance threshold Ns. The distance threshold Ns may be a set distance (space between the manually propelled vehicle 1 and the user) where a possibility for the user to collide with the manually propelled vehicle 1 is sufficiently low even if the manually propelled vehicle 1 takes a sharp turn without hindrance in the operation of the manually propelled vehicle 1. For example, a distance determined by an experiment or the like may be set to the distance threshold Ns. Alternatively, the distance threshold Ns may be a set value that can be changed by the manual operation of the user based on the information (e.g., correlation table information associated with the distance threshold Ns and the physique structure of the user) stored in a memory not illustrated.

These functional blocks are provided in order to realize assisting human power according to a walking posture and intent of the user by setting a variety of parameters of the wheel driver 91 according to the output of the grip sensor 71. The parameters that are set may be, for example, various target values of a rotation direction, rotation speed, and rotation torque of the left and right motors 911L and 911R, or the like. The rotation torque of the left and right motors 911L and 911R may be set proportional to the output of the grip sensor 71, or may be set based on the optimized correlation by ergonomics.

Further, when the output of the ground sensor 72 indicates that the drive wheel 31 is not grounded, the controller 80 may set a variety of parameters of the wheel driver 91 so as to stop or apply a brake of the electromotive drive of the wheel 30. At that time, the controller 80 may further set the variety of parameters of the wheel driver 91 so that the target values of the speed and acceleration of the manually propelled vehicle 1 (e.g., ambulatory assist vehicle) are lower than those of a steady state.

Furthermore, when at least one of the drive wheels 31 (left or right drive wheels 31L and 31R) is moving backward and it is determined by the determining circuit 83 that there is an object (e.g., a leg of the user) therebehind, the controller 80 may suppress or stop the electromotor drive of the wheel 30 (drive wheel 31). The drive control of the wheel 30 will be described later.

The electromotor mechanism part 90 may be means to drive each part of the manually propelled vehicle 1 by an electromotor according to an instruction from the controller 80. The electromotor 90 may comprise a wheel driver 91 that drives the wheel 30 by an electromotor according to the instruction from the controller 80 (see FIG. 2). This wheel driver 91 may comprise the left and right wheel drivers 91L and 91R individually in order to control the left and right wheel drive wheels 31L and 31R independently.

Figure 7:
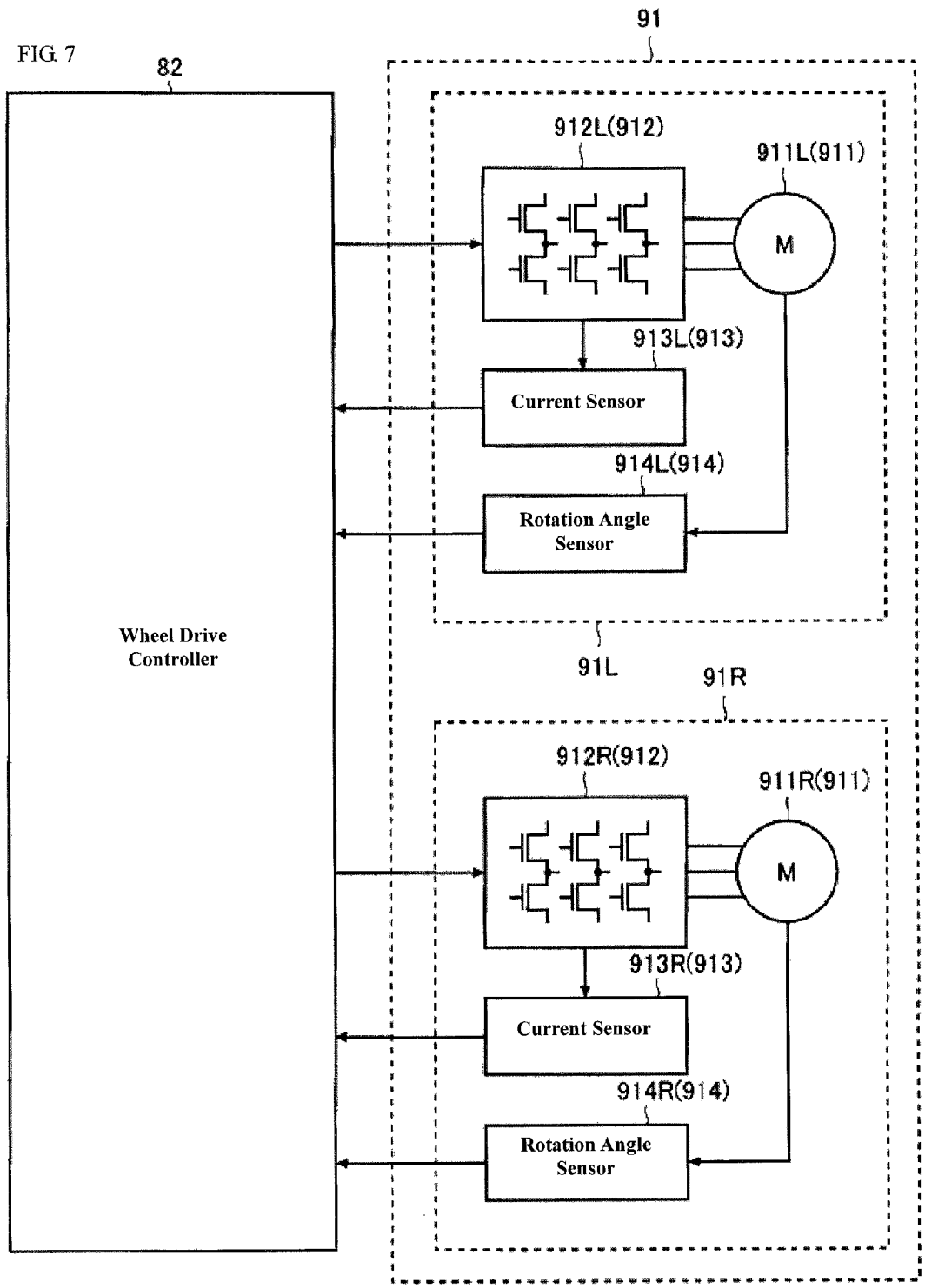
FIG. 7 is a functional block diagram illustrating an example of one configuration of the wheel driver according to one or more embodiments.

FIG. 7 is a functional block diagram illustrating an example of one configuration of the wheel drivers 91L and 91E. The wheel drivers 91L and 91R may comprise motors 911L and 911R, motor drivers 912L and 912R, current sensors 913L and 913R, and rotation angle sensors 914L and 914R, respectively. Each of the motors 911L and 911R may rotate and drive the left and right drive wheels 31L and 31R independently. Each of the motor drivers 912L and 912R may be an inverter circuit for generating a drive current for the motors 911L and 911R according to respective control signals from the controller 80. Each of the current sensors 913L and 913R may detect the driving current that respectively flows to the motors 911L and 911R. Each of the rotation angle sensors 914L and 914R may respectively detect a rotation angle of the motors 911L and 911R. Further, the rotation angle sensors 914L and 914R may also be used to detect a rotation speed of the motors 911L and 911R (or left and right drive wheels 31L and 31R). For example, a number or rotations (that is the rotation speed) per unit time may be found based on the number of output pulses per unit time outputted from the rotation angle sensors 914L and 914R. The rotation angle sensors 914L and 914R are not particularly limited; however, for example, a Hall sensor, resolver, rotary encoder, or the like may be used.

The wheel drive controller 82 may perform feedback control of the motor drivers 912L and 912R so as to match the rotation direction and rotation speed of the motors 911L and 911R with the target values according to each output of the current sensors 913L, 913R and the rotation angle sensors 914L, 914R.

An electric power source 100 may be means for supplying the electric power to the user interface 60, sensor 70, controller 80, and the electromotor 90. A secondary battery (such as a nickel-hydrogen battery or lithium-ion battery) attaching to the vehicle body 10 in a removable manner may be used for the electric power source 100.

Figure 8:
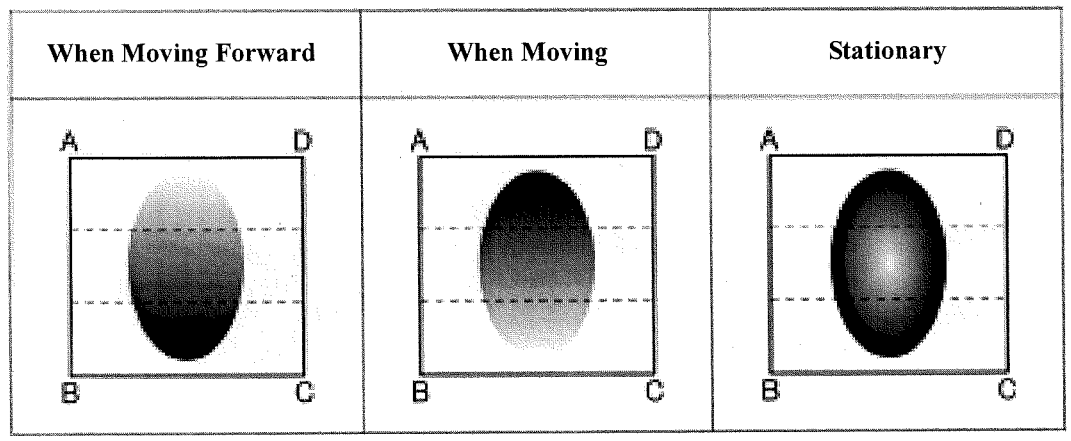
FIG. 8 is an illustration of a pressure distribution of the grip sensor when moving by manual operation (when moving forward, moving backward, or braking) according to one or more embodiments.

Next, a variety of parameters of the wheel driver 91 according to outputs of the grip sensor 71 will be described. FIG. 8 is an illustration of pressure distribution of the grip sensor 71 when moving by manual operation (when moving forward, moving backward, and braking). FIG. 8 is expressed such that black portions become darker as stronger pressure is applied to the grip sensor 71. For example, when the user is pushing the grip 20 to move the manually propelled vehicle 1 forward, a thenar and a hypothenar (a thick portion near the wrist) of the palm that grips the grip 20 may strongly contact the grip sensor 71. Accordingly, the pressure distribution of the grip sensor 71 may become a state where the front side of the grip sensor 71 (BC edge side viewing from the user) of the grip sensor 71 is applied with greater pressure; in other words, the positive acting force (force to push in the forward direction) may be excelled in the moving direction (X axis direction) of the manually propelled vehicle 1. When detecting such pressure distribution, the controller 80 may set various parameters of the wheel driver 91 so as to move the manually propelled vehicle 1 forward smoothly and safely.

On the other hand, when the user is pulling the grip 20 to pull the manually propelled vehicle 1 backward, the balls of four fingers (forefinger, middle finger, ring finger, and little finger) that grip the grip the grip 20 may contact the grip sensor 71 strongly. Accordingly, the pressure distribution of the grip sensor 71 may become a state where the back side of the grip sensor 71 (AD edge side viewing from the user) of the grip sensor 71 is applied with greater pressure, in other words, the negative acting force (force to pull in the backward direction) may be superior in the moving direction (X axis direction) of the manually propelled vehicle 1. The controller 80 may set the various parameters of the wheel driver 91 when such pressure distribution is detected so that the manually propelled vehicle 1 can be moved backward smoothly and safely.

Further, when the user is applying a brake on the manually propelled vehicle 1 by grasping the grip 20 tightly, the whole surface of the palm that grips the grip 20 may contact the grip sensor 71 strongly. Accordingly, the pressure distribution of the grip sensor 71 may become a state where large pressure is applied on the whole surface of the grip sensor 71. Otherwise phrased, both positive and negative acting forces exceed a predetermined threshold in the moving direction (in X axis direction) of the manually propelled vehicle 1, and also a difference between the two values is within a predetermined range. The controller 80 may set the various parameters of the wheel driver 91 when such pressure distribution is detected so that the manually propelled vehicle 1 can be applied a brake smoothly and safely.

Meanwhile, the controller 80 may determine that the user is not holding the grip 20 when the pressure exceeding the predetermined threshold is not applied to either of the right hand grip sensor 71R and the left hand grip sensor 71L. Then, the controller 80 may control the wheel driver 91 so as to stop or apply a brake of the electromotive drive of the wheel 30. Therefore, for example, even when the user releases the hand from the grip 20 while walking downhill, the manually propelled vehicle 1 may automatically slow down or stops. Accordingly, the manually propelled vehicle 1 does not continue slipping down the downhill without the ability to apply a brake.

Furthermore, the controller 80 may determine that the user is holding the grip 20 with both hands when the pressure exceeding the predetermined threshold is applied to both the left hand grip sensor 71L and the right hand grip sensor 71R.

Also, the controller 80 may determine that the user is holding the grip 20 with one hand when the pressure exceeding the predetermined threshold is applied to only one side of the left hand grip sensor 71L and the right hand grip sensor 71R. Then, the controller 80 may carry out an appropriate turning assist control according to the judgment result. For example, when the drive wheel 31 is an opposed two-wheel type, the manually propelled vehicle 1 can be assisted to turn by controlling the rotation direction and rotation speed of the left and right drive wheels 31L and 31R.

For example, when slowly turning the manually propelled vehicle 1 left by both hands, the user may apply turning force to the manually propelled vehicle 1 towards the left while pushing the grip 20 forward by the right hand stronger than the left hand. In this case, the processor 81 may determine each target value of the rotation direction and rotation speed of the motors 911L and 911R individually according to the difference between the left and right acting forces applied onto the left grip sensor 71L and the right grip sensor 71R. Further, when slowly turning the manually propelled vehicle 1 to the left by one hand (left hand), the user may apply turning force to the manually propelled vehicle 1 towards the left by pushing the grip 20 forward by the thenar of the left hand while twisting the wrist to the left side so as to pulling the grip 20 draw closer by the balls of four fingers. In this case, the processor 81 may determine each target value of the rotation direction and rotation speed of the motors 911L and 911R individually according to the difference of each acting force applied onto the left and right half area of the left grip sensor 71L. Then, the controller 80 may drive and control the right drive wheel 31R to drive stronger than that of the left drive wheel 31L. When turning the manually propelled vehicle 1 right by both hands or one hand (right hand), the left drive wheel 31L and the right drive wheel 31R may be driven and controlled in the same way by reversing the left and right. In this manner, when turning the manually propelled vehicle 1 slowly, the left drive wheel 31L and the right drive wheel 31R may be driven forward by a different driving force.

Meanwhile, when turning the manually propelled vehicle 1 sharply, there is a case where the drive wheel 31 of inner wheel side is driven rearward. For example, when turning while the manually propelled vehicle 1 is a stationary state, or when turning by operating the grip 20 so as to push hard one side of left or right of the grip 20 forward and also push the other side backward, one of the drive wheels 31 may be driven rearward. A description of a turning assisting function of the manually propelled vehicle 1 in such case is given with reference to specific examples.

Figure 9:
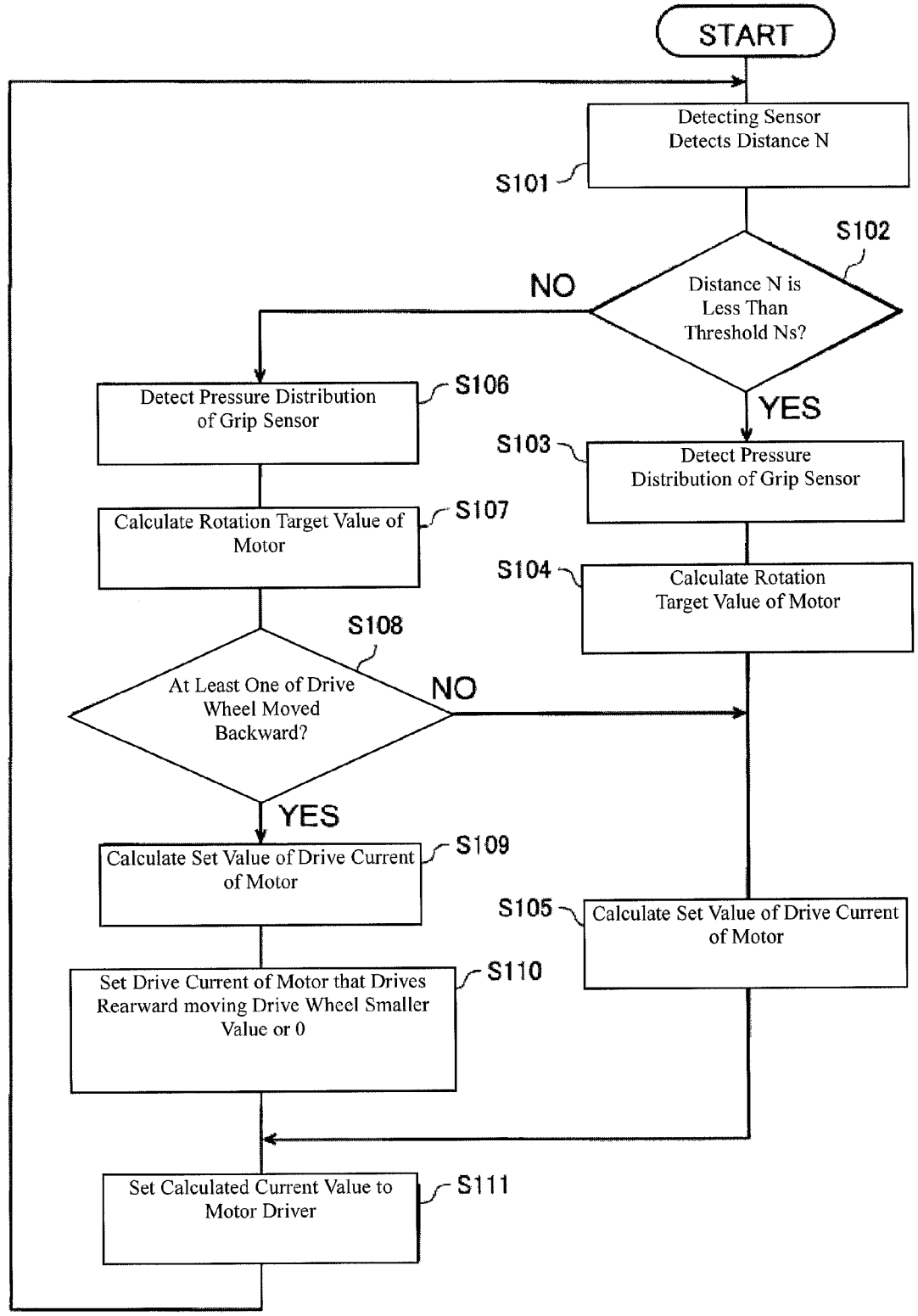
FIG. 9 is a flowchart to describe an operation of a turning assist function of the manually propelled vehicle 1 according to one or more embodiments.

FIG. 9 is a flowchart to describe an operation of a turning assist function of the manually propelled vehicle 1. A process illustrated as an example in FIG. 9, for example, starts when the wheel 30 is driven, and ends when the wheel 30 stops.

First, a distance sensor 73 may detect a distance N to the rearward object (user) (step S101). Then, a determining circuit 83 may determine whether or not the distance N is less than the predetermined distance threshold Ns (step S102).

When determining circuit 83 determines that the distance is less than the distance threshold Ns (YES in step S102), it is determined that the user is directly behind the manually propelled vehicle 1, and it is estimated that the user is not behind the drive wheel 31. In this case, the processor 81 may detect distribution of pressure applied to the grip sensor 71 by the user (step S103). Further, the processor 81 may calculate rotation target values (target values of rotation direction and rotation torque) of the left and right motors 911L and 911R based on the detected pressure distribution (step S104). Furthermore, processor 81 may calculate a set value of driving currents that supply to the left and right motors 911L and 911R based on the calculated rotation target value (step S105). Then, the process proceeds to step S111 that will be described later.

On the other hand, when it is determined that the distance is not less than the distance threshold Ns (NO in step S102), the estimation is made that the user is behind one side of the manually propelled vehicle 1, and particularly behind the drive wheel 31 (either one of left or right drive wheel 31L or 31R). In this case, the processor 81 may detect distribution of pressure applied to the grip sensor 71 by the user (step S106). Further, the processor 81 may calculate rotation target values (target values of rotation direction and rotation torque) of the left and right motors 911L and 911R based on the detected pressure distribution (step S107).

Next, the determining circuit 83 may detect whether or not at least one side of the left or right drive wheels 31L or 31R is driven in the rearward direction based on the calculated rotation target value (step S108). When it is determined that neither are driven in the rearward direction (NO in step S108), the process proceeds to step S105.

When it is determined that at least one side is driven in the rearward direction (YES in step S108), the processor 81 may calculate set values of the driving currents of the left and right motors 911L and 911R based on the calculated rotation target value (step S109). Further, the processor 81 may set the set value of the drive current of the motor 911 that drives the rearward moving drive wheel 31 to a value smaller than the calculated set value or to 0 (step S110). By this setting, the rearward moving drive wheel 31 can be braked or held back (stopped). Then, the process proceeds to step S111 that will be described later.

In step S111, the left and right motor drivers 912L and 912R respectively generate driving currents corresponding to the calculated or the set value and supply the generated driving currents to the motors 911L and 911R. Then, the process returns to step S101.

According to the turning assist function described above, it can be estimated whether or not the user is behind one side (particularly behind drive wheel 31) of the manually propelled vehicle 1 based on the detected result of the distance sensor 73 disposed on the backside surface of the vehicle body 10. Further, when it is estimated that the user is behind one side, the rearward moving drive wheel 31 may be driven and controlled so as to be braked or stopped at the time of turning the manually propelled vehicle 1 sharply. Accordingly, when turning the manually propelled vehicle 1, the user can be prevented from colliding into the manually propelled vehicle 1 and a leg of the user can be prevented from contacting against the drive wheel 31. Accordingly, the possibility of accidents occurring thereby can be significantly reduced.

Next, a description of the turning assist function of the manually propelled vehicle 1 is given in detail with reference to two embodiments using the distance sensor 73 and a comparative example without using the distance sensor 73.

EXAMPLE 1

Figure 10:
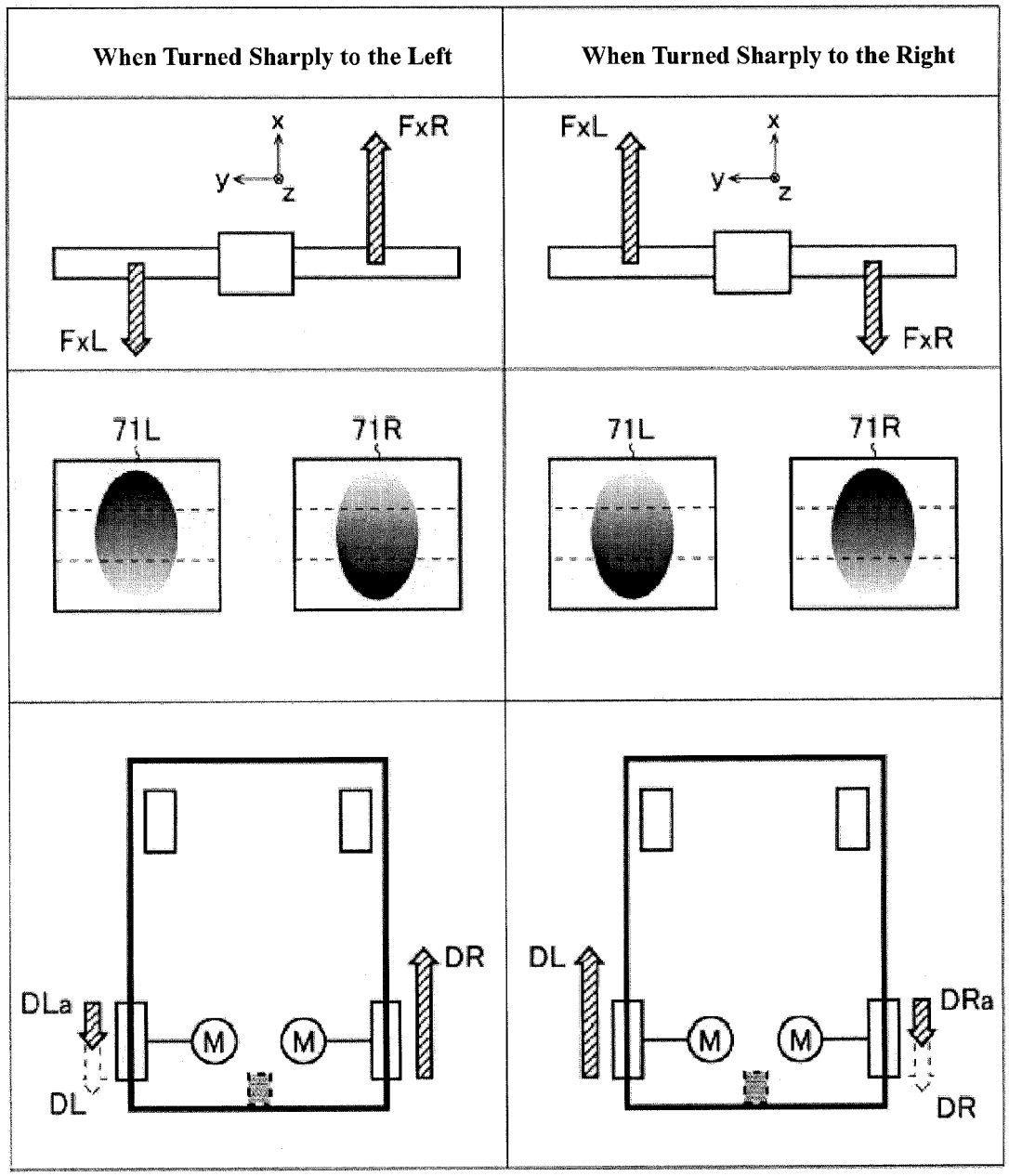
FIG. 10 is an explanatory diagram of the turning assist function when the manually propelled vehicle 1 is turned sharply operated with both hands according to one or more embodiments.

First, a description is given of when an manually propelled vehicle 1 is turned sharply with both hands. FIG. 10 is an explanatory diagram of a turning assist function when the manually propelled vehicle 1 is turned sharply operated with both hands. When it is determined that the user is operating the grip 20 with both hands, a processor 81 that monitors output of the grip sensor 71 may compare a distribution of pressure applied by the left hand and a distribution of pressure applied by the right hand. Then, the processor 81 may set a turning target value of the left and right drive wheels 31L and 31R according to the comparison result of the pressure distribution of the grip 20 and the detected result of the distance sensor 73.

Figure 11:
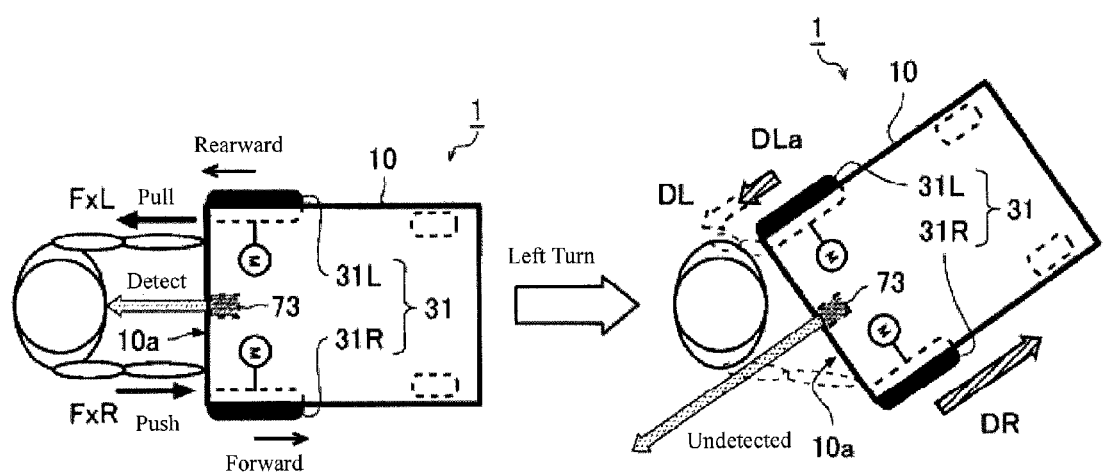
FIG. 11 is an explanatory diagram of the turning operation when the manually propelled vehicle 1 in one or more embodiments of the first example is turned sharply operated with both hands.

FIG. 11 is an explanatory diagram of the turning operation when the manually propelled vehicle 1 in one or more embodiments of the first example is turned sharply with both hands. For example, when the manually propelled vehicle 1 is turned sharply to the left with both hands as illustrated in FIG. 11, the user may apply acting force F×L to the left side of the grip 20 to draw closer to the user (rearward) with the left hand, and applies acting force F×R to the right side of the grip 20 to push forward with the right hand. By this operation, the turning force to the left may be given to the manually propelled vehicle 1. Then, the left drive wheel 31L may be driven rearward and the right drive wheel 31R may be driven forward.

When distance N outputted by the distance sensor 73 is not less than the predetermined distance threshold Ns (in other words, when the distance sensor 73 does not detect the user), it may be estimated that the user has moved relatively behind one side (left side) of the manually propelled vehicle 1 as illustrated in FIG. 11, and particularly behind the left drive wheel 31L. Therefore, the right drive wheel 31R may be driven forward by driving force DR corresponding to the right acting force F×R; however, the left drive wheel 31L may be driven backward by driving force DLa that is smaller than the driving force DL corresponding to the left acting force F×L. Alternatively, the left drive wheel 31L may be controlled so as not to drive backwards. That is, the rearward moving left drive wheel 31L may be braked or stopped by the drive control (0≤DLa<DL).

Meanwhile, when distance N outputted by the distance sensor 73 is less than the predetermined distance threshold Ns (in other words, when the distance sensor 73 detects the user), the user may be directly behind the manually propelled vehicle 1, and accordingly, it may be estimated that the user is not behind the drive wheel 31 and, particularly, not behind the left drive wheel 31L. Therefore, the left drive wheel 31L may be driven backwards by the driving force DL corresponding to the left acting force F×L, and the right drive wheel 31R may be driven forward by the driving force DR corresponding to the right acting force F×R.

Further, contrary to FIG. 11, the similar control may also be performed when turning the manually propelled vehicle 1 sharply to the right with both hands. In this case, the user may apply acting force F×L to push forward onto the left side of the grip 20 by the left hand, and may apply acting force F×R to draw closer to the user (rearward) onto the right side of the grip 20 by the right hand. By this operation, the turning force to the right may be given to the manually propelled vehicle 1. Then, the left drive wheel 31L may be driven forward and the right drive wheel 31R may be driven backwards.

When distance N outputted by the distance sensor 73 is not less than the predetermined distance threshold Ns (in other words, when the distance sensor 73 does not detect the user), it may be estimated that the user has moved relatively behind one side (right side) of the manually propelled vehicle 1, and particularly behind the right drive wheel 31R. Therefore, the left drive wheel 31L may be driven forward by driving force DL corresponding to the left acting force F×L; however, the right drive wheel 31R may be braked and driven backwards by driving force DRa that is smaller than the driving force DR corresponding to the left acting force F×R. Alternatively, the right drive wheel 31R may be controlled so as not to drive backwards. That is, the rearward moving right drive wheel 31R may be braked or stopped by the drive control (0≤DRa<DR).

Meanwhile, when distance N outputted by the distance sensor 73 is less than the predetermined distance threshold Ns (in other words, when the distance sensor 73 detects the user), the user may be directly behind the manually propelled vehicle 1, and accordingly, it is estimated that the user is not behind the drive wheel 31. Therefore, the left drive wheel 31L may be driven forward by the driving force DL corresponding to the left acting force F×L, and the right drive wheel 31R may be driven backward by the driving force DR corresponding to the right acting force F×R.

As a result of such drive control, the left and right drive wheels 31L and 31R may assist the left turn or right turn of the manually propelled vehicle 1 and may also be driven and controlled independently so as not to collide the manually propelled vehicle 1 into the user. Accordingly, even if the user cannot move in accordance with the turning of the manually propelled vehicle 1, a collision with the user can be buffered or prevented who is behind one side of the manually propelled vehicle 1. Furthermore, it may significantly reduce the risk where a leg of the user contacts the rearward moving drive wheel 31 and get involved in a dangerous situation.

EXAMPLE 2

Figure 12:
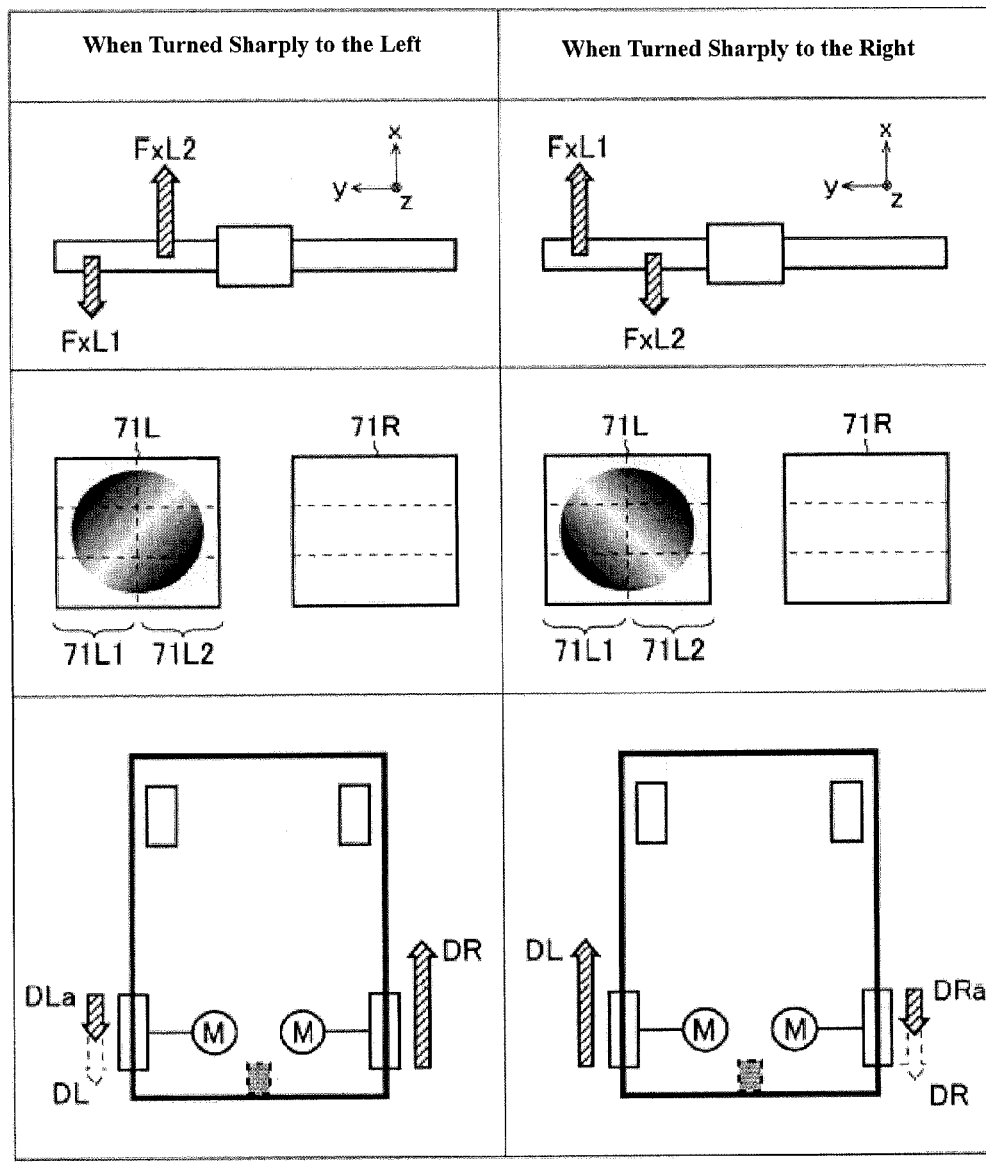
FIG. 12 is an explanatory diagram of the turning assist function when the manually propelled vehicle 1 in one or more embodiments of the first example is turned sharply operated with one hand.

Next, a description is given of when an manually propelled vehicle 1 is turned sharply with one hand. FIG. 12 is an explanatory diagram of a turning assist function of when the manually propelled vehicle 1 in one or more embodiments of the first example is turned sharply with one hand (a left hand operation in the example illustrated in the FIG.). When it is determined that the user is operating the grip 20 with one hand, a processor 81 that monitors output of the grip sensor 71 may divide the region where pressure is applied by one hand into two sub-regions. When left hand grip sensor 71L and right hand grip sensor 71R are provided separately, the grip sensor 71 held with one hand may be divided into two sub-regions. For example, as illustrated in FIG. 12, the left hand grip sensor 71L that is held with the left hand may divide regions into a first sub-region 71L1 and a second sub-region 71L2. Then, the processor 81 may set a turning target value of the left and right drive wheels 31L and 31R according to the comparison result of the pressure distribution applied to each sub-region and the detected result of the distance sensor 73.

For example, when the manually propelled vehicle 1 is turned sharply to the left with the left hand, the user may twist the left wrist to the left by pulling the left side of the grip 20 with the finger pads of four fingers of the left hand while pushing the left side of the grip 20 with the thenar of the left hand so as to push forward. That is, the user may apply an acting force F×L1 drawing closer to the user (rearward) to the first sub-region 71L1 of the left hand grip sensor 71L, and may apply an acting force F×L2 pushing forward to the second sub-region 71L2 of the left hand grip sensor 71L. By this operation, the turning force in the left direction may be given to the manually propelled vehicle 1. Then, the left drive wheel 31L may be driven backwards and the right drive wheel 31R may be driven forwards.

When distance N outputted by the distance sensor 73 is not less than the predetermined distance threshold Ns (in other words, when the distance sensor 73 does not detect the user), it may be estimated that the user has moved relatively behind one side (left side) of the manually propelled vehicle 1, and particularly behind the left drive wheel 31L. Therefore, the right drive wheel 31R may be driven forward by driving force DR corresponding to the acting force F×L2; however, the left drive wheel 31L may be braked and driven backward by driving force DLa that is smaller than the driving force DL corresponding to the acting force F×L1. Alternatively, the left wheel 31L may be controlled so as not to drive backwards. That is, the rearward moving left drive wheel 31L may be braked or stopped by the drive control (0≤DLa<DL).

Meanwhile, when distance N outputted by the distance sensor 73 is less than the predetermined distance threshold Ns (in other words, when the distance sensor 73 detects the user), the user may be directly behind the manually propelled vehicle 1. Accordingly, it may be estimated that the user is not behind the drive wheel 31. Therefore, the left drive wheel 31L may be driven backwards by the driving force DL corresponding to the acting force F×L1, and the right drive wheel 31R may be driven forward by the driving force DR corresponding to the right acting force F×L2.

Further, conversely, when the manually propelled vehicle 1 is turned sharply to the right with the left hand, the user may twist the left wrist to the right by pulling the grip 20 with the finger pads of four fingers of the left hand while pushing the grip 20 with the antithenar of the left hand so as to push forward. By this operation, the turning force in the right direction may be given to the manually propelled vehicle 1. Then, the left drive wheel 31L may be driven forwards and the right drive wheel 31R is driven backwards.

When distance N outputted by the distance sensor 73 is not less than the predetermined distance threshold Ns (in other words, when the distance sensor 73 does not detect the user), it may be estimated that the user has moved relatively behind one side (right side) of the manually propelled vehicle 1, and particularly behind the right drive wheel 31R. Therefore, the left drive wheel 31L may be driven forward by driving force DL corresponding to the acting force F×L1; however, the right drive wheel 31R may be braked and driven backwards by driving force DRa that is smaller than the driving force DR corresponding to the acting force F×L2. Alternatively, the right drive wheel 31R may be controlled so as not to drive backwards. That is, the rearward moving right drive wheel 31R may be braked or stopped by the drive control (0≤DRa<DR).

Meanwhile, when distance N outputted by the distance sensor 73 is less than the predetermined distance threshold Ns (in other words, when the distance sensor 73 detects the user), the user may be directly behind the manually propelled vehicle 1, and accordingly, it is estimated that the user is not behind the drive wheel 31. Therefore, the left drive wheel 31L may be driven forwards by the drive force DL corresponding to the acting force F×L1, and right drive wheel 31R may be driven backwards by the driving force DR corresponding to the right acting force F×L2.

As a result of these drive controls, the left and right drive wheels 31L and 31R may assist the left or right turn of the manually propelled vehicle 1, and may also be driven and controlled independently so as to prevent a collision of the manually propelled vehicle 1 and the user. Therefore, even if the user cannot move with the turning movement of the manually propelled vehicle 1, it may be possible to buffer or prevent a collision from the user who is behind one side of the manually propelled vehicle 1. Moreover, the entanglement risk of a leg of the user contacting the drive wheel 31 can be reduced. The turning operation of the ambulatory assist 1 in the FIG. 12 is performed with the left hand; however, it also can be driven and controlled in a similar manner when performing the turning operation with the right hand.

COMPARATIVE EXAMPLE

Figure 13:
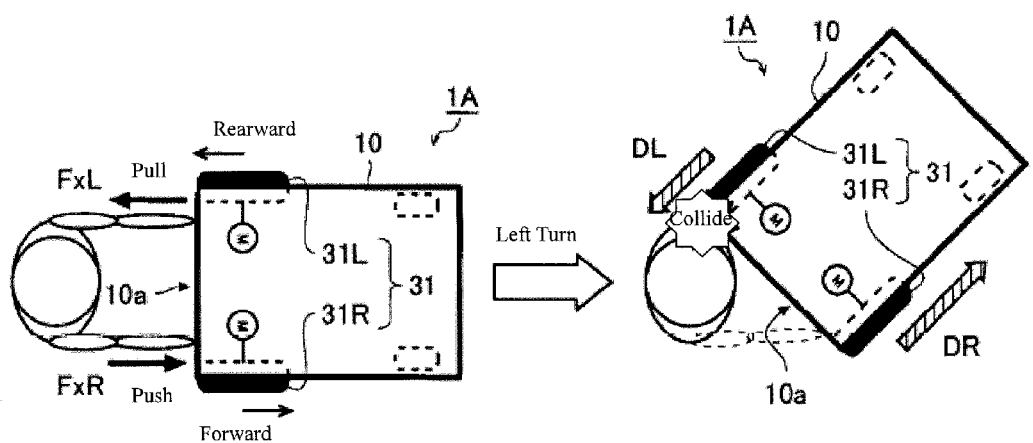
FIG. 13 is an explanatory diagram of a turning operation when the manually propelled vehicle 1 that is not equipped with the distance sensor is turned sharply operated with both hands according to one or more embodiments.

Next, a description is given of when an manually propelled vehicle 1A that is not equipped with the distance sensor 73 is turned sharply in order to confirm the operation and effects of the distance sensor 73 provided in the manually propelled vehicle 1. FIG. 13 is an explanatory diagram of a turning operation when the manually propelled vehicle 1A that is not equipped with the distance sensor 73 is turned sharply with both hands. The manually propelled vehicle 1A of the comparative example is configured similarly as the manually propelled vehicle 1 of one or more embodiments of the present examples other than that the distance sensor 73 is not provided.

For example, when turning the manually propelled vehicle 1A sharply to the left with both hands as illustrated in FIG. 13, the left drive wheel 31L is driven backwards by driving force DL corresponding to left acting force F×L to draw the left side of the grip 20 closer to the user (rearward). Further, the right drive wheel 31R is driven forward by the driving force DR corresponding to the right acting force F×R to push the right side of the grip 20 forward.

Accordingly, if the user cannot move in accordance with the turning of the manually propelled vehicle 1A, the user would move relatively to the rearward on one side (left side in FIG. 13) of the manually propelled vehicle 1A and collide against the manually propelled vehicle 1A. Furthermore, if a leg of the user moves to behind the drive wheel 31 (left drive wheel 31L in FIG. 13) of the inner wheel side of the turning manually propelled vehicle 1A, there is a risk of getting entangled and injuring the leg by contacting the drive wheel 31.

As described above, the manually propelled vehicle 1 (e.g., ambulatory assist vehicle) according to one or more embodiments of the first example may comprise the vehicle body 10, drive wheel 31, wheel driver 91, distance sensor 73, determining circuit 83, and controller 80. The drive wheel 31 may comprise the left and right drive wheels 31L and 31R that are driven and controlled independently and used for traveling the vehicle body 10 in accordance with walking by the user. The wheel driver 91 may electromotively drive the drive wheels 31 (left and right drive wheels 31L and 31R). The distance sensor 73 functions as a detecting part to detect the user located behind the vehicle body 10. The determining circuit 83 determines whether or not the user is behind the drive wheel 31 based on the detected result of the distance sensor 73. Further, when it is determined that one of the left or right drive wheels 31L or 31R moves backward and also that the user is behind on that side, the controller 80 may suppress or stop the electromotor drive of that side. By having such configuration, for example, even if one of the left or right drive wheels 31L or 31R has moved rearward when turning the manually propelled vehicle 1, the electromotor drive of one of the rearward moving left or right drive wheels 31L or 31R may be suppressed or stopped when it is determined that the user is behind the rearward driving drive wheels 31L or 31R. Accordingly, when the manually propelled vehicle 1 is turned, a collision with the user, who is on one side of the manually propelled vehicle 1, can be buffered or prevented because the turning of the manually propelled vehicle 1 can be braked or stopped.

Further, in the manually propelled vehicle 1 (e.g., ambulatory assist vehicle) in one or more embodiments of the first example, the distance sensor 73 may be provided between the left and right drive wheels 31L and 31R in order to detect whether or not the user is behind the vehicle body 10 except behind the left or right drive wheels 31L and 31R in a planar view when viewed from vertically above. The distance sensor 73 may output a distance N to an object (e.g. user) located behind the distance sensor 73. Furthermore, when one of the left or right drive wheels 31L or 31R has moved backward and also the distance N is not less than the distance threshold Ns, the controller 80 may suppress or stop the electromotor drive of that side of the left or right drive wheels 31L or 31R. By having such configuration, for example, when turning the manually propelled vehicle 1, the distance sensor 73 provided between the left and right drive wheels 31L and 31R can detect whether or not the user is behind the vehicle body 10 except behind the left or right drive wheel 31L and 31R. Furthermore, when the distance N outputted by the distance sensor 73 is not less than the distance threshold Ns, it may be estimated that the user is behind the rearward moving drive wheels 31L or 31R side. Then, the electromotor drive of one of rearward moving drive wheel 31L or 31R may be suppressed or stopped. Accordingly, a collision between the user and the manually propelled vehicle 1 can be buffered or prevented by the distance sensor 73 provided between the left and right drive wheels 31L and 31R.

Further, in the manually propelled vehicle 1 (e.g., ambulatory assist vehicle) in one or more embodiments of the first example, the distance sensor 73 may detect whether or not a leg of the user is behind the wheel 30. By having such configuration, the contact between the leg of the user and the rearward moving drive wheels 31L or 31R side can be prevented, or the impact at the time of contact can be buffered.

<Second Embodiment>

Figure 14:
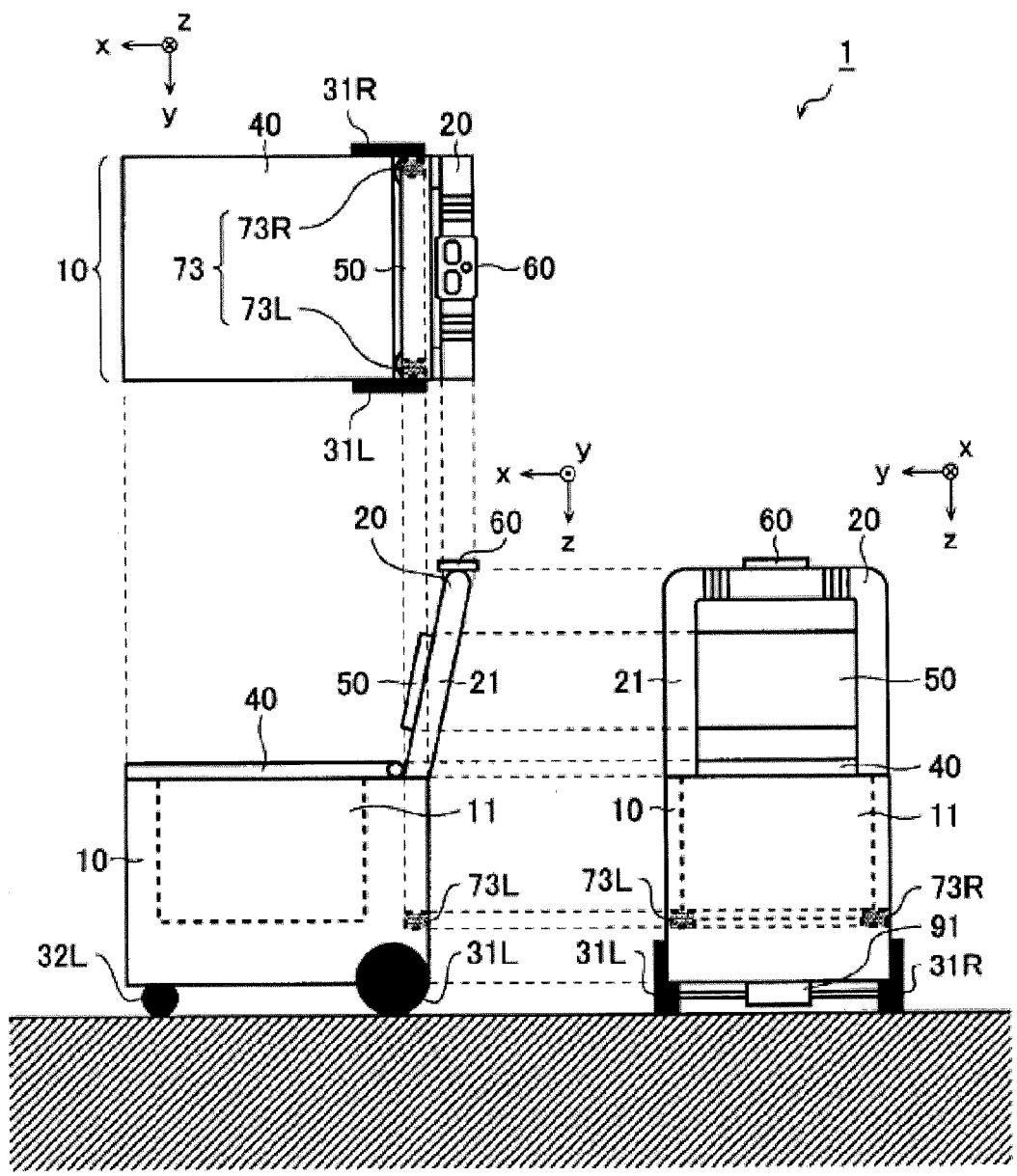
FIG. 14 is an external view of an manually propelled vehicle 1 according to one or more embodiments of a second example.

FIG. 14 is an external view of an manually propelled vehicle 1 according to one or more embodiments of a second example. The lower part of FIG. 14 schematically illustrates in order from the left on the sheet, a left side view, and a posterior view (back view) of the manually propelled vehicle 1. Further, in the upper part of FIG. 14, a top view of manually propelled vehicle 1 is schematically illustrated. One or more embodiments of the second example may have fundamentally the same configuration as one or more embodiments of the first example, and may have a feature where a distance sensor 73 is provided in both left and right sides on a backside surface 10a of a vehicle body 10 as a configuration element in order to detect whether or not a user is behind one side (particularly behind drive wheel 31) of the manually propelled vehicle 1. Accordingly, the same or similar configuration elements as those in one or more embodiments of the first example are given the same referential codes, and a duplicated description will be omitted. Descriptions of a feature of one or more embodiments of the second example will be focused and given hereinafter.

The distance sensor 73 may comprise a left and right distance sensor 73L and 73R. The left and right distance sensor 73L and 73R may respectively be provided in the left side and right side on the backside surface 10a of the vehicle body 10 as illustrated in the posterior view in FIG. 14, and also be disposed above the left and right drive wheels 31L and 31R as illustrated in each illustration in FIG. 14. By describing more specifically, the left side distance sensor 73L may be disposed at a location that is superimposed on the left drive wheel 31L in a planar view when viewing the manually propelled vehicle 1 from vertically above or near the left drive wheel 31L. Further, the right side distance sensor 73R may be disposed at a location that is superimposed on the right drive wheel 31R in a planar view when viewing the manually propelled vehicle 1 from vertically above or near the left drive wheel 31R. The left and right distance sensors 73L and 73R output distance N to an object (e.g., user) located behind each thereof.

Figure 15:
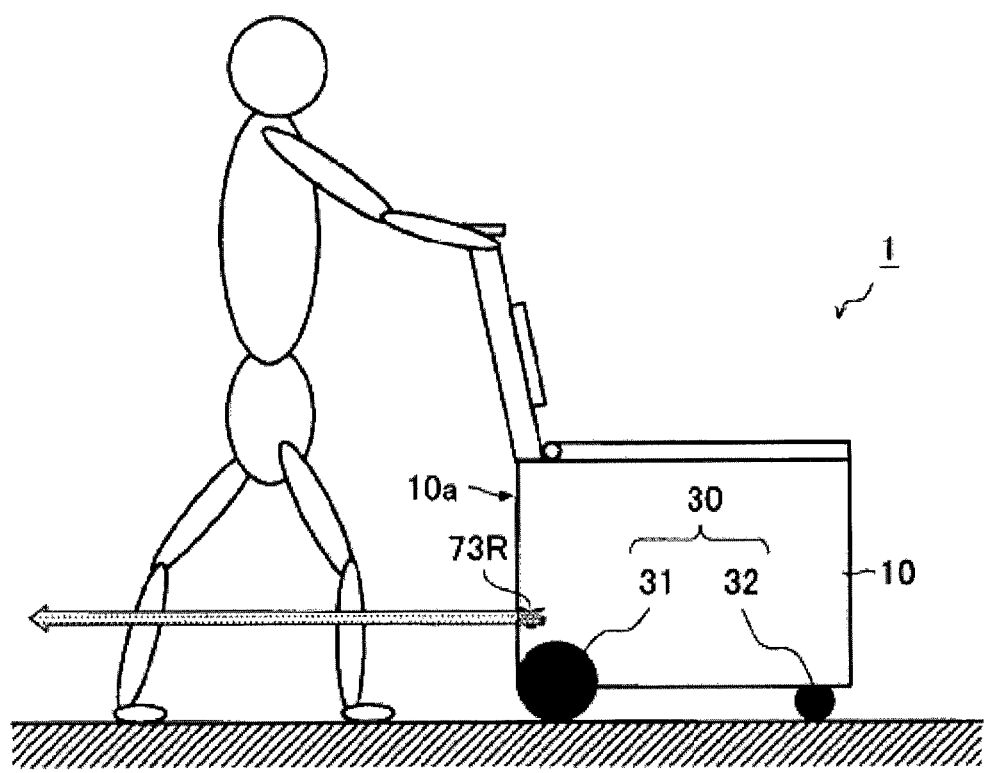
FIG. 15 is a side view illustrating a location of a distance sensor in one or more embodiments of the second example.

FIG. 15 is a side view illustrating a location of the distance sensor 73 according to one or more embodiments of the second example. The disposed locations in the vertical direction of the distance sensor 73 (left and right distance sensors 73L and 73R) are not particularly limited; and the left and right distance sensors 73L and 73R may be disposed respectively in locations that detect the left and right legs of the user as illustrated in FIG. 15. Alternatively, they may be disposed respectively in locations that detect a torso of the user.

Figure 16:
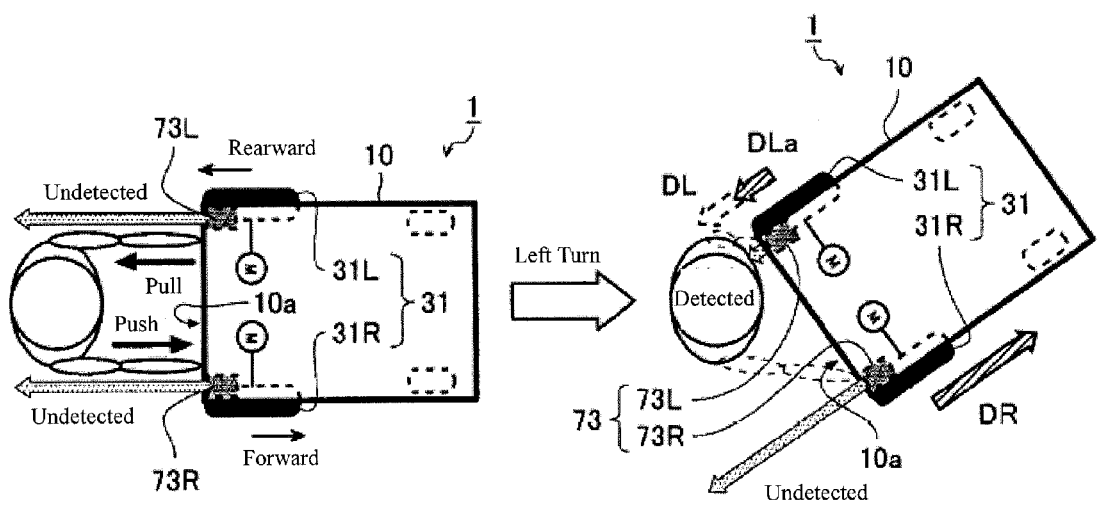
FIG. 16 is an explanatory diagram of the turning operation when the manually propelled vehicle 1 in one or more embodiments of the second example is turned sharply operated with both hands.

Next, a description of a turning assist function of the manually propelled vehicle 1 that provides the left and right distance sensors 73L and 73R. FIG. 16 is an explanatory diagram of a turning operation when the manually propelled vehicle 1 in one or more embodiments of the second example is turned sharply with both hands. For example, if turning the manually propelled vehicle 1 sharply to the left with both hands as illustrated in FIG. 16, the left drive wheel 31L may be driven backward and the right drive wheel 41R may be driven forward. At that time, when the distance N outputted by the left side distance sensor 73L is less than a predetermined distance threshold Ns (in other words, when the distance sensor 73L detects the user), it may be determined that the user has moved relatively behind one side (left side) of the manually propelled vehicle 1, and particularly behind the left drive wheel 31L. Therefore, the right drive wheel 31R is driven forward by the driving force DR corresponding to the right acting force F×R to push the right side of the grip 20 forward; however, the left drive wheel 31L may be braked and driven backward by the driving force DLa by being braked. The driving force DLa may be set smaller than that of the driving force DL corresponding to the left acting force F×L that draws the left side of the grip 20 closer to the user (backward). Alternatively, the left drive wheel 31L may be controlled so as not to drive backwards. That is, the rearward moving left drive wheel 31L may be braked or stopped by the drive control ($0 \leq DLa < DL$).

On the contrary to FIG. 16, if the manually propelled vehicle 1 is turned sharply to the right side with both hands, the left drive wheel 31L may be driven forward and the right drive wheel 31R is driven backward. At that time, when the distance N outputted by the right side distance sensor 73R is less than the predetermined distance threshold Ns (in other words, when the distance sensor 73R detects the user), it may be determined that the user has moved relatively behind one side (right side) of the manually propelled vehicle 1, and particularly behind the right drive wheel 31R. Therefore, the left drive wheel 31L may be driven forward by the driving force DL corresponding to the left acting force F×L; however, the right drive wheel 31R may be braked and driven backward by the driving force DRa. This driving force DRa may be set smaller than that of the driving force DR corresponding to the right acting force F×R. Alternatively, the right drive wheel 31R may be controlled so as not to drive backwards. That is, rearward moving right drive wheel 31R may be braked or stopped by the drive control ($0 \leq DRa < DR$).

On the other hand, even when the manually propelled vehicle 1 is turned sharply, there is a case in which the distances N outputted from both left and right distance sensors 73L and 73R are not less than a predetermined distance threshold Ns (in other words, both the left and right distance sensors 73L and 73R do not detect the user). In this case, it may be determined that the user is not behind the left or right drive wheels 31L and 31R because the user is directly behind the manually propelled vehicle 1. Therefore, the left drive wheel 31L may be driven backwards by the driving force DL corresponding to the left acting force F×L, and the right drive wheel 31R may be driven forward by the driving force DR corresponding to the right acting force F×R.

As a result of such drive control, the left and right drive wheels 31L and 31R may assist the left turn or right turn of the manually propelled vehicle 1 and may also be driven and controlled independently so as not to collide the manually propelled vehicle 1 into the user. Accordingly, even if the user cannot move in accordance with the turning of the manually propelled vehicle 1, a collision with the user can be buffered or prevented who is behind one side of the manually propelled vehicle 1. Furthermore, the entanglement risk of a leg of the user coming in contact with the drive wheel 31 can be reduced. The descriptions described above were given when turning the manually propelled vehicle 1 sharply with both hands; however, it can be driven and controlled in a similar manner when turning to the left or right sharply by a one hand operation.

As described above, in the manually propelled vehicle 1 (e.g., ambulatory assist vehicle) in one or more embodiments of the second example, the distance sensors 73L and 73R provided above the left and right drive wheel 31L and 31R, respectively, may function as a detecting part. The distance sensors 73L and 73R may output the distance to an object located behind the distance sensors 73L and 73R, respectively. Further, if one of the left or right drive wheels 31L or 31R has moved backward and also if the distance N outputted by the distance sensors 73L or 73R provided above that side is less than the distance threshold Ns, the controller 80 may suppress or stop the electromotor drive of that side of the left or right drive wheel 31L or 31R. By having such configuration, for example, when turning the manually propelled vehicle 1, if the distance N outputted by the distance sensor 73L or 73R above the rearward moving drive wheel 31L or 31R side is less than the threshold Ns, it may be determined that the user is behind the rearward moving drive wheel 31L or 31R. Then, the electromotor drive of that side which is the rearward moving drive wheel 31L or 31R may be suppressed or stopped. Accordingly, a collision between the user and the manually propelled vehicle 1 can be surely buffered or prevented by the distance sensors 73L and 73R respectively provided above the left and right drive wheels 31L and 31R.

<Third Embodiment>

One or more embodiments of the third example may have fundamentally the same configuration as one or more embodiments of the first example above, and has a feature where a range sensor 74 is provided instead of the distance sensor 73 as the configuration element in order to detect the location of the user behind the manually propelled vehicle 1. Accordingly, the same or similar configuration elements as those in one or more embodiments of the first example are given the same referential codes, and a duplicated description will be omitted. Descriptions of a feature of one or more embodiments of the third example will be focused and given hereinafter.

The range sensor 74 may be, for example, a laser scanner of single-axis scanning that scans a predetermined scanning plane semicircularly behind the manually propelled vehicle 1 using a laser beam. The range sensor 74 may be provided on the backside surface 10a of the vehicle body 10 and is disposed between the left and right drive wheels 31L and 31R in a planar view when viewing the manually propelled vehicle 1 from vertically above. The range sensor 74 may scan behind the vehicle body 10 and functions as a detecting part that detects a location of a user (for example, relative direction and distance).

Figure 17:
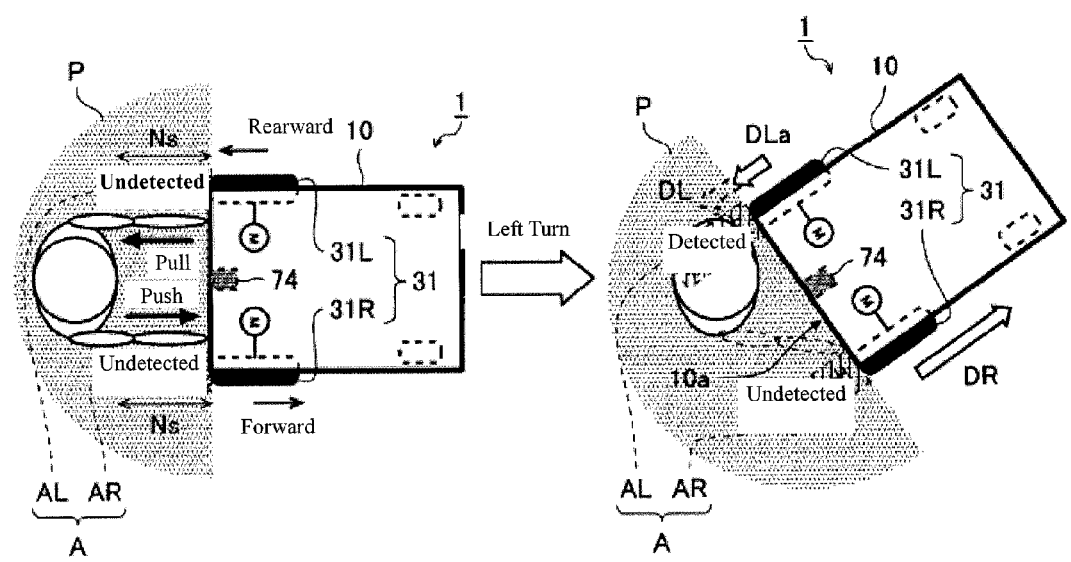
FIG. 17 is an explanatory diagram of the turning operation when the manually propelled vehicle 1 in one or more embodiments of a third example is turned sharply operated with both hands.

Next, a turning assist function of the manually propelled vehicle 1 that provides the range sensor 74 will be described. FIG. 17 is an explanatory diagram of a turning operation of when the manually propelled vehicle 1 of one or more embodiments of the third example is turned sharply with both hands. When the manually propelled vehicle 1 has a turning motion, the range sensor 74 may scan the scanning plane P (e.g., horizontal plane) semicircularly to detect a location of the user who is behind the manually propelled vehicle 1. The scanning plane P may be set, for example, so as to detect a location of the torso of the user, or set to detect a location of a leg of the user. The determining circuit 83 may determine based on the detected result of the range sensor 74, whether or not at least one portion of the body of the user is within a region A illustrated in a shaded area in FIG. 17. The region A may be configured of a region AL behind the left drive wheel 31L and a region AR behind the right drive wheel 31R. A width from the backside surface 10a of each of the region AL and AR may be set the width same as the distance threshold Ns. Further, a processor 81 that monitors output of a grip sensor 71 may compare a distribution of pressure applied by the left hand and a distribution of pressure applied by the right hand. Then, the processor 81 may set a turning target value of the left and right drive wheels 31L and 31R according to the detecting result of the distance sensor 73, the determining result of the determining circuit 83, and the comparison result of the pressure distribution of the grip 20.

For example, if turning the manually propelled vehicle 1 sharply to the left with both hands as illustrated in FIG. 17, the left drive wheel 31L may be driven backward and the right drive wheel 41R is driven forward. At that time, when the range sensor 74 detects at least a portion of the body of the user within the left side region AL, it may be determined that the user has moved relatively behind one side (left side) of the manually propelled vehicle 1 as illustrated in FIG. 17, particularly behind the left drive wheel 31L. Therefore, the right drive wheel 31R may be driven forward by driving force DR corresponding to right acting force F×R to push the right side of the grip 20 forward; however, the left drive wheel 31L may be braked and driven backward by driving force DLa by being braked. The driving force DLa may be set smaller than that of the driving force DL corresponding to the left acting force F×L that draws the left side of the grip 20 closer to the user (backward). Alternatively, the left drive wheel 31L may be controlled so as not to drive backwards. That is, the rearward moving left drive wheel 31L may be braked or stopped by the drive control (0≤DLa<DL).

On the contrary to FIG. 17, if turning the manually propelled vehicle 1 sharply to the right side with both hands, the left drive wheel 31L may be driven forward and the right drive wheel 31R is driven backward. At that time, when the range sensor 74 may detect at least a portion of the body of the user within the right side region AR, it may be determined that the user has moved relatively behind one side (right side) of the manually propelled vehicle 1, particularly behind the right drive wheel 31R. Therefore, the left drive wheel 31L may be driven forward by the driving force DL corresponding to the left acting force F×L; however, the right drive wheel 31R may be braked and controlled and driven backward by the driving force DRa. This driving force DRa may be set smaller than that of the driving force DR corresponding to the right acting force F×R. Alternatively, the right drive wheel 31R may be controlled so as not to drive backwards. That is, the rearward moving right drive wheel 31R may be braked or stopped by the drive control (0≤DRa<DR).

On the other hand, when the range sensor 74 does not detect at least a portion of the body of the user within the region A (that is the left and right regions AL and AR), it may be determined that the user is directly behind the manually propelled vehicle 1, so the user is not behind the left and right drive wheels 31L and 31R. Therefore, the left drive wheel 31L may be driven backwards by the driving force DL corresponding to the left acting force F×L, and the right drive wheel 31R may be driven forward by the driving force DR corresponding to the right acting force F×R.

As a result of such drive control, the left and right drive wheels 31L and 31R may be driven and controlled independently so as to assist left turn or right turn of the manually propelled vehicle 1. Thus, a collision between the manually propelled vehicle 1 and the user can be prevented. Accordingly, even if the user cannot move in accordance with the turning motion of the manually propelled vehicle 1, a collision against the user who is behind on one side of the manually propelled vehicle 1 can be buffered or prevented. Furthermore, the entanglement risk of a leg of the user coming in contact with the drive wheel 31 can be reduced. The descriptions were illustrated as an example when turning the manually propelled vehicle 1 sharply with both hands in FIG. 17; however, the same process may apply when turning to the left or right sharply by a one hand operation.

Further, the laser scanner of single-axis scanning may be used for the range sensor 74 in the above description; however, a three-dimensional scanner of two-axis scanning type may be used. Accordingly, rearward of the manually propelled vehicle 1 can be scanned semicircularly, and therefore, it can detect a three-dimensional position of the user rearward of the manually propelled vehicle 1. Thus, it can detect accurately and quickly whether or not the user will collide into the manually propelled vehicle 1.

Further, the setting of the region A (or left and right regions AL and AR) is not limited to the illustrated example of FIG. 17. For example, the optimized region by using ergonomics may be set or a region that can be changed by manual operation of the user using a user interface 60 for the region A (or left and right regions AL and AR).

As described above, in the manually propelled vehicle 1 (e.g., ambulatory assist vehicle) in one or more embodiments of the third example, the range sensor 74 that detects a location of the user by scanning rearward of the vehicle body 10 may function as the detecting part. By having such configuration, the location of the user behind the vehicle body 10 can be detected by the range sensor 74. Accordingly, one or more embodiments can determine accurately whether or not the user is behind the drive wheel 31 (particularly rearward moving drive wheel 31 or 31R) based on the detecting position of the user.

OTHER ALTERNATIVE EXAMPLES

An manually propelled vehicle 1 is described as an example in the embodiments described above; however, the application of the present invention is not limited thereto and can be widely applied to even other manually propelled vehicles (such as baby carriages, dollies, wheelchairs, and the like).

Further, in the embodiments described above, the processor 81, wheel drive controller 82, and the determining circuit 83 may be a functional block of the logic circuit such as microcomputer; however, the applicable scope of the present invention is not limited to the illustrated examples. All of them or at least one portion may be a physical configuration element such as an electronic circuit.

Furthermore, in the embodiments described above, when the manually propelled vehicle 1 is turned sharply, if it is determined that the user is behind the rearward moving drive wheel 31, the electromotor drive of the rearward moving drive wheel 31 may be designed to be braked or stopped; however, the applicable scope of the present invention is not limited the illustrated examples. A configuration may be designed so that the electromotor of the moving forward drive wheel 31 is also driven and controlled to brake or stop in order to have a proper turning motion of the manually propelled vehicle 1.

Various embodiments of the present invention have been described above; however, the present invention is not limited to these embodiments. In particular, those skilled in the art can add various modifications to these embodiments without departing from the scope of the invention. Also, the features of these embodiments can be used in various combinations with each other, and are not intended to be limited to the specific combinations disclosed herein. That is, the embodiments described above should be considered as exemplifications in all respects and are not restricted, and the technical scope of the present invention is indicated by the scope of claims rather than the descriptions of the embodiments described above.

[Industrial Applicability]

One or more embodiments of the present invention can be used for safety improvement and convenience enhancement of a manually propelled vehicle.

Although the disclosure has been described with respect to only a limited number of embodiments, those skilled in the art, having benefit of this disclosure, will appreciate that various other embodiments may be devised without departing from the scope of the present invention. Furthermore, those of ordinary skill in the art would appreciate that certain "units," "parts," "elements," or "portions" of one or more embodiments of the present invention may be implemented by a circuit, processor, etc. using known methods. Accordingly, the scope of the invention should be limited only by the attached claims.

[Description of the Reference Numerals]

1, 1A manually propelled vehicle (e.g., ambulatory assist vehicle)
10 vehicle body
10a backside surface
11 baggage compartment
20 grip
21 support part
22 (22L, 22R) grip (left and right)
30 wheel
31 (31, 31R) drive wheel (left and right)
32 (32L, 32R) idler wheel (left and right)
40 seat (and baggage compartment upper lid)
50 backrest
60 user interface
61 manual operation part
62 notification part (e.g., speaker)
70 sensor
71 (71L, 71R) grip sensor (left and right)
72 ground sensor
73 (73L, 73R) distance sensor (left and right)
74 range sensor
80 controller
81 processor
82 wheel drive controller
83 determining circuit
90 electromotor
91 (91L, 91R) wheel driver (left and right)
911 (911L, 911R) motor (left and right)
912 (912L, 912R) motor driver (left and right)
913 (913L, 913R) current sensor (left and right)
914 (914L, 914R) rotation angle sensor (left and right)
100 power source
PS pressure sensor

What is claimed is:

1. A manually propelled vehicle, comprising:
a vehicle body;
a left drive wheel and a right drive wheel;
a wheel driver that drives the left and right drive wheels;

a sensor that detects a user behind the vehicle body; and
a controller that determines whether the user is behind the left or right drive wheel based on a detected result of the sensor, wherein
when one of the left or right drive wheel moves backward and the controller detects that the user is behind the one of the left or right drive wheel, the controller suppresses or stops the wheel driver from driving the one of the left or right drive wheel.

2. The manually propelled vehicle according to claim 1, wherein
the sensor comprises a distance sensor provided between the left and right drive wheels and that detects whether the user is behind the vehicle body in an area that is not behind the left or right drive wheel when viewed from vertically above in a planar view,
the distance sensor outputs a distance to an object located behind the distance sensor, and
when the one of the left or right drive wheel moves backward and the distance output by the distance sensor is greater than or equal to a threshold, the controller suppresses or stops the wheel driver from driving the one of the left or right drive wheel.

3. The manually propelled vehicle according to claim 1, wherein
the sensor comprises a distance sensor provided respectively above the left and right drive wheels,
each of the distance sensors respectively outputs a distance to an object located behind the distance sensor, and
when the one of the left or right drive wheel moves backward and the distance output by the distance sensor provided above the one of the left or right drive wheel is less than a threshold, the controller suppresses or stops the wheel driver from driving the one of the left or right drive wheel.

4. The manually propelled vehicle according to claim 1, wherein the sensor comprises a range sensor that detects a location of the user by scanning behind the vehicle body.

5. The manually propelled vehicle according to claim 1, wherein the sensor detects whether a leg of the user is behind the left or right drive wheel.

6. A method for controlling a manually propelled vehicle comprising a vehicle body, a left drive wheel and a right drive wheel, and a wheel driver that drives the left and right drive wheels, the method comprising:
detecting a user behind the vehicle body;
determining whether the user is behind the left or right drive wheel based on the detecting; and
when one side of the left or right drive wheel moves backward and the determining determines that the user is behind the one side of the left or right drive, suppressing or stopping the wheel driver from driving the one of the left or right drive wheel.

7. The method according to claim 6, further comprising:
detecting, with a distance sensor provided between the left and right drive wheels, whether the user is behind the vehicle body in an area that is not behind the left or right drive wheel when viewed from vertically above in a planar view;
outputting a distance to an object located behind the distance sensor; and
when the one of the left or right drive wheel moves backward and the distance is greater than or equal to a threshold, suppressing or stopping the wheel driver from driving the one of the left or right drive wheel.

8. The method according to claim 6, further comprising:
detecting, with each of distance sensors provided respectively above the left and right drive wheels, a distance to an object located behind the respective distance sensors;
outputting the distance to the object; and
when the one side of the left or right drive wheel moves backward and the distance output by the distance sensor provided above the one of the left or right drive wheel is less than a threshold, suppressing or stopping the wheel driver from driving the one of the left or right drive wheel.

9. The method according to claim 6, further comprising detecting a location of the user by scanning behind the vehicle body.

10. The method according to claim 6, further comprising detecting whether a leg of the user is behind the left or right drive wheel.

11. The manually propelled vehicle according to claim 2, wherein the sensor detects whether a leg of the user is behind the left or right drive wheel.

12. The manually propelled vehicle according to claim 3, wherein the sensor detects whether a leg of the user is behind the left or right drive wheel.

13. The manually propelled vehicle according to claim 4, wherein the sensor detects whether a leg of the user is behind the left or right drive wheel.

14. The method according to claim 7, further comprising detecting whether a leg of the user is behind the left or right drive wheel.

15. The method according to claim 8, further comprising detecting whether a leg of the user is behind the left or right drive wheel.

16. The method according to claim 9, further comprising detecting whether a leg of the user is behind the left or right drive wheel.

* * * * *

UNITED STATES PATENT AND TRADEMARK OFFICE
CERTIFICATE OF CORRECTION

PATENT NO. : 9,242,561 B2  
APPLICATION NO. : 14/471761  
DATED : January 26, 2016  
INVENTOR(S) : Takahiro Katayama Page 1 of 1

It is certified that error appears in the above-identified patent and that said Letters Patent is hereby corrected as shown below:

Claims

Column 22, claim 6, line 1 "left or right drive, suppressing" should read --left or right drive wheel, suppressing--.

Signed and Sealed this
Tenth Day of May, 2016

Michelle K. Lee
*Director of the United States Patent and Trademark Office*